US012092650B2

(12) United States Patent
Hurlburt et al.

(10) Patent No.: US 12,092,650 B2
(45) Date of Patent: Sep. 17, 2024

(54) LIQUID EVALUATION DEVICE

(71) Applicant: Forward Biotech, Inc., Troy, NY (US)

(72) Inventors: Matthew Hurlburt, Clark Mills, NY (US); Eric LaPier, Nassau, NY (US); Dan Carlo, Johnsonville, NY (US); David Lala, Clifton Park, NY (US); Ian K. Glasgow, Averill Park, NY (US)

(73) Assignee: Forward Biotech, Inc., Troy, NY (US)

( * ) Notice: Subject to any disclaimer, the term of this patent is extended or adjusted under 35 U.S.C. 154(b) by 0 days.

(21) Appl. No.: 18/369,535

(22) Filed: Sep. 18, 2023

(65) Prior Publication Data

US 2024/0003930 A1  Jan. 4, 2024

Related U.S. Application Data

(63) Continuation of application No. PCT/US2022/052338, filed on Dec. 9, 2022.

(60) Provisional application No. 63/287,668, filed on Dec. 9, 2021.

(51) Int. Cl.
*G01N 35/10* (2006.01)
(52) U.S. Cl.
CPC .................... *G01N 35/1016* (2013.01)
(58) Field of Classification Search
None
See application file for complete search history.

(56) References Cited

U.S. PATENT DOCUMENTS

| 5,192,502 | A |   | 3/1993  | Attridge et al. |
| 5,230,866 | A |   | 7/1993  | Shartle et al. |
| 5,458,852 | A | * | 10/1995 | Buechler ............ B01J 19/0093 422/417 |
| 5,498,392 | A | * | 3/1996  | Wilding ................ B01L 7/52 422/50 |
| 5,935,430 | A | * | 8/1999  | Craig ................ G01N 30/6095 210/198.2 |
| 6,193,647 | B1 |   | 2/2001  | Beebe et al. |

(Continued)

FOREIGN PATENT DOCUMENTS

| CN | 101187580 A | 5/2008 |
| CN | 103402641 A | 11/2013 |

(Continued)

OTHER PUBLICATIONS

International Search Report and Written Opinion for International Application No. PCT/US2022/052338, Apr. 25, 2023, 10 pages.

(Continued)

*Primary Examiner* — Brian R Gordon
(74) *Attorney, Agent, or Firm* — LaBatt, LLC

(57) ABSTRACT

A liquid evaluation device including a cartridge with one or more channels formed between two closely spaced substrates is disclosed. The cartridge includes one or more liquid flow structures, each of which can be located in a deposition region for a channel, an entrance region for the channel, and/or an interior region of the channel. Each liquid flow structure is configured to facilitate liquid flow to shape and/or locate the liquid in the channel for measuring a volume of the liquid located in the channel.

20 Claims, 14 Drawing Sheets

(56) References Cited

U.S. PATENT DOCUMENTS

| | | | |
|---|---|---|---|
| 6,695,765 B1* | 2/2004 | Beebe | C12M 23/16 |
| | | | 600/33 |
| 6,921,514 B1* | 7/2005 | Vetter | B01L 3/0293 |
| | | | 422/500 |
| 7,189,580 B2 | 3/2007 | Beebe et al. | |
| 8,091,405 B2 | 1/2012 | Schmid et al. | |
| 9,174,215 B2 | 11/2015 | Vulto et al. | |
| 9,962,696 B2 | 5/2018 | Vullo et al. | |
| 10,233,415 B1* | 3/2019 | Mathur | G01N 33/502 |
| 10,450,542 B2 | 10/2019 | Vulto et al. | |
| 11,278,890 B2* | 3/2022 | Denomme | G01N 21/553 |
| 2001/0051113 A1 | 12/2001 | Juncosa et al. | |
| 2002/0022261 A1* | 2/2002 | Anderson | B01L 3/5027 |
| | | | 435/287.9 |
| 2002/0058329 A1* | 5/2002 | Singh | B82Y 30/00 |
| | | | 435/6.16 |
| 2003/0017467 A1* | 1/2003 | Hooper | B01J 19/0046 |
| | | | 436/180 |
| 2003/0121788 A1 | 7/2003 | Gascoyne et al. | |
| 2004/0028566 A1* | 2/2004 | Ko | B01L 3/502746 |
| | | | 422/505 |
| 2004/0067166 A1 | 4/2004 | Karinka et al. | |
| 2005/0009101 A1* | 1/2005 | Blackburn | B01L 7/52 |
| | | | 435/7.1 |
| 2005/0019224 A1 | 1/2005 | Pechter et al. | |
| 2005/0019231 A1 | 1/2005 | Kahl | |
| 2005/0229696 A1* | 10/2005 | Takayama | B01F 25/4338 |
| | | | 73/204.26 |
| 2005/0229722 A1 | 10/2005 | Howell et al. | |
| 2006/0214101 A1* | 9/2006 | Takahashi | H01J 49/0418 |
| | | | 250/288 |
| 2007/0160474 A1* | 7/2007 | Lida | B01F 23/451 |
| | | | 416/27 |
| 2007/0242105 A1* | 10/2007 | Srinivasan | B01L 3/502761 |
| | | | 347/63 |
| 2007/0286774 A1* | 12/2007 | Barholm-Hansen | |
| | | | B01L 3/502746 |
| | | | 422/400 |
| 2008/0066523 A1 | 3/2008 | Schmid et al. | |
| 2008/0257754 A1 | 10/2008 | Pugia et al. | |
| 2009/0127123 A1* | 5/2009 | Raccurt | G02B 3/14 |
| | | | 205/334 |
| 2010/0045147 A1 | 2/2010 | Harnack et al. | |
| 2010/0254858 A1 | 10/2010 | Paulraj et al. | |
| 2011/0053289 A1 | 3/2011 | Lowe et al. | |
| 2011/0056287 A1 | 3/2011 | Schardt et al. | |
| 2011/0243795 A1 | 10/2011 | Park | |
| 2012/0004140 A1 | 1/2012 | Staker | |
| 2012/0184464 A1 | 7/2012 | Lee et al. | |
| 2013/0121877 A1 | 5/2013 | Ono | |
| 2013/0345088 A1* | 12/2013 | Noji | G01N 33/54313 |
| | | | 506/13 |
| 2015/0040999 A1* | 2/2015 | Vulto | B01L 3/502738 |
| | | | 137/516.11 |
| 2016/0025116 A1 | 1/2016 | Vulto et al. | |
| 2016/0199832 A1* | 7/2016 | Jamshidi | B01F 33/3031 |
| | | | 204/600 |
| 2016/0231163 A1 | 8/2016 | Van't Oever et al. | |
| 2016/0265026 A1* | 9/2016 | Brettschneider | B01L 3/50273 |
| 2017/0045504 A1 | 2/2017 | Blom et al. | |
| 2018/0095067 A1* | 4/2018 | Huff | G01N 33/48721 |
| 2018/0250672 A1* | 9/2018 | Jamshidi | B01L 3/5088 |
| 2018/0311666 A1* | 11/2018 | Dhindsa | B01L 3/502792 |
| 2019/0030537 A1* | 1/2019 | Hadwen | B01L 3/502715 |
| 2019/0142311 A1* | 5/2019 | Heikenfeld | B01L 3/5027 |
| | | | 600/309 |
| 2020/0023357 A1 | 1/2020 | Glasgow | |
| 2021/0170403 A1* | 6/2021 | Waterman | B01L 3/50273 |
| 2021/0362151 A1* | 11/2021 | Karunakaran | B01F 33/3033 |
| 2021/0387194 A1* | 12/2021 | Goto | G01N 21/6456 |
| 2021/0394185 A1* | 12/2021 | Goto | B01L 7/52 |
| 2022/0062901 A1* | 3/2022 | Keefe | B01L 3/502753 |
| 2022/0118445 A1 | 4/2022 | Glasgow | |
| 2022/0213422 A1* | 7/2022 | Zamarayeva | C12N 15/87 |
| 2023/0003683 A1* | 1/2023 | Denomme | G01N 27/4145 |
| 2023/0092258 A1* | 3/2023 | Kurz | B01L 3/502715 |
| | | | 204/547 |
| 2023/0158500 A1* | 5/2023 | Deng | B01L 3/50851 |
| | | | 422/82.07 |
| 2023/0321653 A1* | 10/2023 | Austin | B01L 3/50273 |
| | | | 422/502 |

FOREIGN PATENT DOCUMENTS

| | | |
|---|---|---|
| EP | 0321736 A2 | 6/1989 |
| EP | 2213364 A1 | 8/2010 |
| EP | 2374540 A2 | 10/2011 |
| EP | 3072594 A1 | 9/2016 |
| EP | 3130401 A1 | 2/2017 |
| GB | 2275428 A | 8/1994 |
| JP | 2013156271 A | 8/2013 |
| WO | 2007050013 A1 | 5/2007 |
| WO | 2015099532 A1 | 7/2015 |
| WO | 2016195480 A1 | 12/2016 |
| WO | 2018183896 A1 | 10/2018 |
| WO | 2020154248 A1 | 7/2020 |

OTHER PUBLICATIONS

International Search Report and Written Opinion for International Application No. PCT/US2020/014341, May 25, 2020, 11 pages.
Office action for U.S. Appl. No. 16/497,650, filed Apr. 23, 2021, 22 pages.
Final office action for U.S. Appl. No. 16/497,650, filed Sep. 20, 2021, 25 pages.
Office action for U.S. Appl. No. 16/497,650, filed Feb. 18, 2022, 34 pages.
Final office action for U.S. Appl. No. 16/497,650, filed Jul. 13, 2022, 35 pages.
Notice of allowance for U.S. Appl. No. 16/497,650, filed Nov. 9, 2022, 12 pages.
International Search Report and Written Opinion for International Application No. PCT/US2018/025472, Jun. 14, 2018, 15 pages.
Office action for EP Application No. 18719006.1, Nov. 23, 2020, 5 pages.
Office action for EP Application No. 18719006.1, Jul. 25, 2023, 6 pages.
Office action for Chinese Application No. 201880028976.6, Mar. 26, 2021, 10 pages (english summary).
Office action for Chinese Application No. 201880028976.6, Nov. 22, 2021, 18 pages (english summary).
Notice of grant for Chinese Application No. 201880028976.6, Feb. 28, 2022, 2 pages (no English translation available).

* cited by examiner

LIQUID EVALUATION DEVICE

REFERENCE TO RELATED APPLICATIONS

The current application is a continuation of International Application No. PCT/US2022/052338, filed on 9 Dec. 2022, which claims the benefit of U.S. Provisional Application No. 63/287,668, filed on 9 Dec. 2021, each of which is hereby incorporated by reference.

TECHNICAL FIELD

The disclosure relates generally to evaluation of a liquid, such as a dispensed liquid, and more particularly, to a liquid evaluation solution that uses one or more channels in a cartridge.

BACKGROUND ART

Automated liquid handling systems, also called robotic liquid handlers or just robots, are an essential tool used extensively in laboratories used for biology, chemistry, and other fields. In these systems, one or more pipettes transfer an accurate volume of liquid from one container to another, e.g., for assays, chemical reactions, and other purposes. The volumes they transfer typically range over several orders of magnitude, from less than 1 microliter to over 1 milliliter.

One common existing approach for determining the dispensing accuracy of an automated liquid handling system uses a balance to measure a mass of the dispensed liquid. The liquid's mass is then converted to volume based upon a known density of the liquid at a measured temperature of the liquid. Commonly, distilled water is used for this purpose. However, this approach has drawbacks.

For example, the balance must be very sensitive. To this extent, to accurately measure microliter volumes of liquid to better than 1%, the balance must be more accurate than 10 micrograms. Balances this accurate are expensive. Additionally, these balances are subject to errors from air currents across the pan, vibrations, and evaporation. Evaporation also is a source of error in the measurement, which is difficult to control to negligible levels, especially considering the relatively large amount of surface exposed to air relative to the volume of the dispensed liquid. In addition, this solution is not a direct measurement of the volume. Rather, a mass measurement must be converted to volume using additional measurements, including that of the liquid's density and/or its temperature (which can be converted to density), each of which further reduces an accuracy of this measurement approach.

An alternative approach for measuring automated liquid handling system dispense accuracy uses a colorimetric measurement. In this approach, the automated liquid handling system is used to dispense a volume of a liquid dye in which the color is very accurately controlled, into a well with a known volume of liquid, and a change in color is measured. This measurement approach also does not directly measure the liquid volume. Furthermore, the measured change in color must be combined with additional measurements (e.g., volume of the other liquid, temperature, density, and/or the like), in order to calculate the dispensed volume, further reducing the accuracy of this approach. Additionally, similar to the previously described approach, this approach also requires expensive equipment, requires training, and must be performed where the equipment is located, or the expensive equipment must be cautiously transported to the automated liquid handling system.

Another approach uses a cartridge with multiple glass capillaries. The user can dispense aliquots (samples) of liquid into multiple wells simultaneously, flip the wells into position so that the aliquots of liquid contact the entrances to the capillaries, at which time capillary action draws the liquid into the capillaries. By knowing the internal diameter of the capillaries and the lengths of capillaries filled by the aliquots of liquid, one knows the volumes of liquid in the capillaries, and thus the volumes that were dispensed. This method requires the user to flip the wells into position and is limited by the effectiveness of capillary action in round ducts.

Another liquid evaluation system uses a cartridge including channels configured to pull a liquid into the channels by capillary action. The cartridge can include a first plate and a second plate located in close proximity to the first plate, which can be oriented in an upright position. An internal facing surface of each plate can include regions forming the channels. Each of the regions can have an affinity for the liquid. The close proximity of the plates and the regions having an affinity for the liquid cause the liquid to be pulled into the channel by capillary action.

Note that multichannel pipettes are also an essential tool in these laboratories and the above methods, while described for automated liquid handling systems, also apply to determining the volumes of liquid dispensed by multichannel pipettes.

SUMMARY OF THE INVENTION

The inventor recognizes that many approaches for determining the accuracy of a multichannel liquid handling device, such as a multichannel pipette or an automated liquid handling system, can be quite tedious, expensive, and require multiple measurements, each of which potentially introduces error into the measurement process.

An embodiment of the device is configured for measuring the volume of a liquid dispensed, for example, from a robotic dispenser or a multi-channel pipette. Embodiments described herein can improve on the prior solutions in which a cartridge formed by two plates in close proximity is used to form channels for evaluating the liquid.

Aspects of the invention provide a liquid evaluation device including a cartridge comprising one or more channels formed between two closely spaced substrates. The cartridge includes one or more liquid flow structures, each of which can be located in a deposition region for a channel, an entrance region for the channel, and/or an interior region of the channel. Each liquid flow structure is configured to facilitate liquid flow to shape and/or locate the liquid in the channel for measuring a volume of the liquid located in the channel.

A first aspect of the invention provides a cartridge, comprising: a first substrate having a first internal facing side; a second substrate having a second internal facing side, wherein a lateral extent of each channel in the set of channels is defined by at least one coating located on at least one of the first internal facing side or the second internal facing side, and an air gap located between each of the at least one coating and the other of the first internal facing side or the second internal facing side, wherein a set of channels for evaluating liquid are formed between the first internal facing side and the second internal facing side, wherein a channel of the set of channels includes an entrance region and an interior region; and at least one liquid flow structure located in at least one of the entrance region or the interior region of the channel, wherein the at least one liquid flow structure is configured to facilitate liquid flow to shape and/or locate the liquid in the channel for measuring a volume of the liquid located in the channel.

A second aspect of the invention provides a cartridge comprising: a first substrate having a first internal facing side; a second substrate having a second internal facing side, wherein a set of channels for evaluating liquid are formed between the first internal facing side and the second internal facing side, wherein a lateral extent of each channel in the set of channels is defined by at least one coating located on at least one of the first internal facing side or the second internal facing side, and an air gap located between each of the at least one coating and the other of the first internal facing side or the second internal facing side, wherein a channel of the set of channels includes an entrance region and an interior region; a deposition region located on one of the first or second substrates immediately adjacent to the entrance region for the channel; and at least one liquid flow structure located in at least one of the deposition region, the entrance region, or the interior region, wherein the at least one liquid flow structure is configured to facilitate liquid flow to shape and/or locate the liquid in the channel for measuring a volume of the liquid located in the channel.

A third aspect of the invention provides a cartridge comprising: a first substrate having a first internal facing side; at least one second substrate having a second internal facing side, wherein a plurality of channels for evaluating liquid are formed between the first internal facing side of the first substrate and the second internal facing side of each of the at least one second substrate, wherein a lateral extent of each channel in the plurality of channels is defined by at least one coating located on at least one of the first internal facing side or the second internal facing side, and an air gap located between each of the at least one coating and the other of the first internal facing side or the second internal facing side, wherein each channel of the plurality of channels includes an entrance region and an interior region; a deposition region located on one of the first or second substrates immediately adjacent to the entrance region for each channel of the plurality of channels; and at least one liquid flow structure located in at least one of the deposition region, the entrance region, or the interior region, for each channel of the plurality of channels, wherein the at least one liquid flow structure is configured to facilitate liquid flow to shape and/or locate the liquid in the corresponding channel for measuring a volume of the liquid located in the corresponding channel.

The illustrative aspects of the invention are designed to solve one or more of the problems herein described and/or one or more other problems not discussed.

BRIEF DESCRIPTION OF THE DRAWINGS

Various features of the disclosure will be more readily understood from the following detailed description of the various aspects of the invention taken in conjunction with the accompanying drawings that depict various aspects of the invention.

FIGS. 1A and 1B show illustrative processes for fabricating a liquid evaluation device according to embodiments, while

FIG. 6A shows a cross-section view of an illustrative cartridge including a channel formed between super hydrophobic barriers according to an embodiment, while

FIG. 13A shows a top view of an illustrative cartridge including liquid flow structures for shaping the liquid column within the channels according to an embodiment, while

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1A:
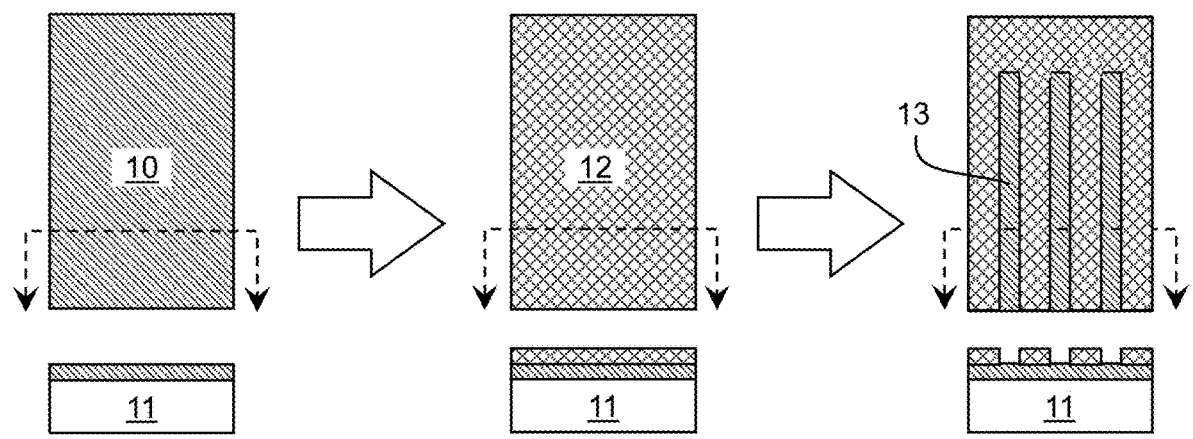

A device is described herein, which can include several channels for evaluating (e.g., measuring the volume of) liquid dispensed near a channel entrance. An aqueous liquid can fill a channel, which can be defined in a cartridge composed of closely spaced substrates, such as glass upper and lower surfaces, as clean glass provides a hydrophilic surface. A hydrophobic coating can define the channel lateral boundaries. A hydrophobic photoresist can provide a good material for the hydrophobic coating since such a material can be precisely patterned. To evaluate (e.g., measure the volume of) an oily liquid, the channels can be made using a hydrophobic substrate with hydrophilic coatings defining the channel lateral boundaries. In embodiments in which the coating thickness is inconsequential or can be accurately controlled, the channels of the device can be defined in reverse, with liquid filling the coated regions and avoiding the non-coated regions.

As used herein, a proximal end of a substrate refers to an end of the substrate that includes an entrance for the channel, while a distal end of a substrate refers to an end of the substrate that is located opposite the end of the substrate with the entrance. Unless otherwise stated, the term "lateral" refers to a plane that is at a right angle to the principal axis for the channel, and "lateral area" refers to a two-dimensional area of the lateral plane for a corresponding region. These terms are used for convenience and do not imply any orientation of a cartridge during use.

Embodiments described herein utilize passive features to manipulate the flow of liquid in one or more channels of a cartridge. Such passive features utilize one or more structures of predetermined shapes, spacing, widths, thicknesses, and/or the like, to take advantage of natural forces or phenomena acting on the liquid and/or inherent attributes of the liquid to accomplish a corresponding objective. For example, embodiments can include one or more passive features that can cause an entire volume of a liquid dispensed adjacent to a channel entrance to enter a channel and remain therein. Once in the channel, embodiments can include one or more passive features that cause the volume of liquid to have a desired shape, remain in a desired location, flow in a particular manner, etc. Further passive features can enhance a contrast between the liquid in a channel and one or more features used to evaluate the liquid, such as graduations. The manipulated flow and/or enhanced contrast can improve an accuracy with which a volume of liquid, such as liquid dispensed from a pipette, can be measured.

In an illustrative embodiment, the device comprises a cartridge including a substrate (e.g., glass plate) sandwich comprising a lower substrate, an upper substrate, spacers (e.g., spacer balls) to precisely maintain the spacing between the lower and upper substrates, and adhesive to retain the spacer balls and affix the substrates together, with the proper spacing. The channels between the substrates are defined by one or more coatings, such as photoresist boundaries or other hydrophobic material, that can be accurately patterned on one or both substrate surfaces.

For example, for a device including eight precise channels, there can be seven regions of a coating (e.g., photoresist) located between adjacent channels, a region of coating before the first channel, and a region or coating beyond the eighth channel.

Embodiments of the device can incorporate one or more additional features to increase hydrophobicity of the regions located between the channels. For example, a device described herein can include one or more geometric features that result in a higher hydrophobicity for such regions.

An embodiment of the spacers can be magnetic, such as magnetic spacer balls, which enables the spacers to be retained in predetermined positions using magnetic fields. In this case, an embodiment of a substrate can be metallic or another material to which the magnetic spacers can be attracted. Such substrate can be coated with a coating that provides a desired hydrophilic or hydrophobic surface.

In an embodiment, the liquid evaluation device can further include a base, such as a stand or a frame, on which the cartridge can be placed or mounted. In a further embodiment, as a white background would offer good background for determining the boundary of dye in the channels, the device also can include a white card, which can be placed between the base and the cartridge. In a still further embodiment, the white card can contain information that can be read by the user, such as graduations, text, QR codes, etc. For example, for a channel configured to evaluate approximately 200 microliter (uL) of liquid, numbers on the card stock could be located near graduations in the device, e.g., to indicate 50, 100, 150, 200, and 250 uL levels.

In an embodiment, a bottom substrate, such as a bottom glass plate, can be painted or coated with a background color, such as white. In a further embodiment, the bottom substrate can include markings that are painted or coated, affixed, engraved, engraved and backfilled, and/or the like, which can be visible to a user against the background color.

In an embodiment, the cartridge can be bonded to the base. A cover can be included to provide nicer aesthetics and nicer ergonomics and function as a bezel. The cover can be bonded to the base and/or to the cartridge. An embodiment of the cover can include a region covering a portion of the cartridge, e.g., with markings, or to hold a label.

An embodiment of the base can be fabricated to be very flexible so that the base can conform to the flatness of the cartridge when the two are bonded together and/or the weight of the cartridge forces the base to rest on a flat surface without rocking. For example, an injection molded base might have some warpage and rock on a flat surface, however, the substrates forming the cartridge (e.g., glass plates) are rigid and tend to be flat. As a result, bonding a flexible base to the cartridge can ensure that the cartridge sits flat on a flat surface, with no rocking.

In an embodiment, dye added to the photoresist can enable the hydrophobic regions to be more easily distinguished from the channels and/or liquid in channels, e.g., by providing a darker color for the regions including the photoresist. In a more particular embodiment, the dye is a different color than a color of the liquid (e.g., a dye used in the liquid) with which the cartridge is intended to be utilized. In an embodiment, narrow bands of photoresist can provide graduations in the channels. Likewise, narrow bands of no photoresist in the regions between the channels can serve as graduation marks. Characters composed of area(s) with no photoresist in the regions located between channels also can be configured to provide readable text.

An embodiment also can include a hydrophilic coating added to the channel surfaces, not the boundary regions, which can increase the capillary action drawing in the liquid into the channels.

The colors of the liquid (e.g., a dye added thereto), the hydrophobic coating (e.g., a dye added to the coating), the background (e.g., the card), printing on the card, etc., all can be selected to maximize contrast. For example, the color of the channel boundaries, e.g., the hydrophobic regions, can be opposite of (e.g., complementary to) the color of the liquid that fills the channels—such as one being orange the other blue. In an embodiment, the print on the card can be of the same color as the liquid, so that as the liquid fills the channels, values under the liquid are obscured and not readable. For instance, if there are numbers indicating approximately 10, 20, 30, and 40 uL of liquid, if the liquid covered the 10 and 20 uL values, it would be clear that the volume of liquid is more than 20 uL.

Regardless, the liquid can be any type of liquid that is desired for evaluation and/or suitable for evaluating a liquid handling system. Illustrative liquids include any of various aqueous liquids, such as water, a biological sample (e.g., blood), a reagent, a buffer solution, etc., any of various oil-based liquids, such as petroleum products, lipids, etc. When the evaluation is performed as part of analyzing an accuracy and precision and/or repeatability (e.g., consistency) of dispensing a desired volume of liquid by an automated liquid handling system or multichannel pipette, the liquid can be configured to assist in the measurement. For example, the liquid can be filtered, distilled, dyed for enhanced contrast, and/or the like. In embodiments where one or more other attributes of the liquid are evaluated, the liquid can comprise any type of liquid sample. For example, the liquid can comprise water, which is sampled from any of numerous locations, blood drawn from a patient, and/or the like.

Figure 1B:
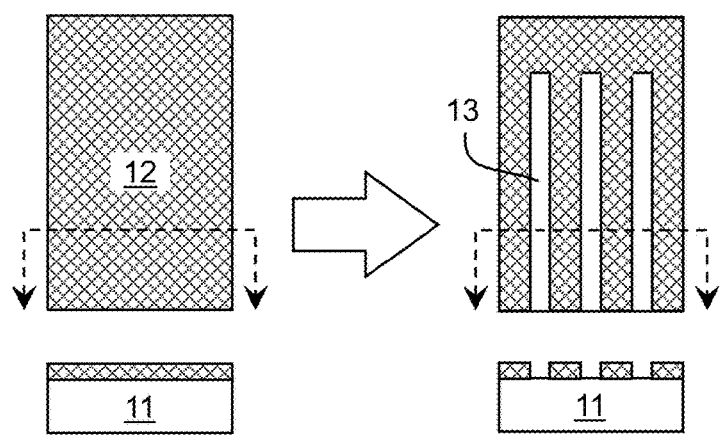

Turning to the drawings, FIGS. 1A and 1B show illustrative processes for fabricating a liquid evaluation device according to embodiments. In various embodiments described herein, two substrates, such as the substrate 11, are used to define one or more channels located therebetween. In a particular embodiment, the substrate 11 can be a glass plate. However, it is understood that embodiments of the substrate 11 can be formed of any of various other suitable materials including silicon, fused silica, plastic (e.g., injection molded), metal, etc. In embodiments, a substrate 11 material can be selected based on the material having either a strong affinity for (e.g., when a surface of the substrate forms a bottom or top of a channel) or little to no affinity for (e.g., when a surface of the substrate forms a barrier defining a channel) a corresponding liquid to be utilized in conjunction therewith. In each case, a surface of the substrate 11 can be partially or entirely coated with a material that provides a desired affinity for the corresponding liquid. Furthermore, a substrate 11 material can be selected based on its suitability for applying one or more layers of material to define the channel thereon.

In FIG. 1A, one or more thin films of a hydrophilic coating 10 are applied to a surface of a substrate 11, such as a glass plate. For example, the hydrophilic coating can be clear and can increase capillary action of the substrate 11. A photoresist layer 12 can be applied to the entire surface of the substrate 11, covering the hydrophilic coating 10. Subsequent exposure and development of the photoresist layer 12 can result in areas of the photoresist layer 12 being removed. For example, the removed areas can form a plurality of channels 13 as illustrated. Any areas with removed photoresist can retain the hydrophilic coating 10, which can allow the corresponding channels 13 formed to have improved capillary action. In particular, only fluid located in the channels 13 will experience the increased capillary action provided by the hydrophilic coating 10. In an embodiment, the hydrophilic coating 10 can be a silica/titanium dioxide photocatalyst, such as TPX-HPC from Green Millennium, Inc.

In FIG. 1B, the substrate 11 (e.g., a glass plate) is coated with a photoresist layer 12. Subsequent exposure and development of the photoresist layer 12 can result in areas of the photoresist layer 12 being removed. For example, the removed areas can form a plurality of channels 13 as illustrated.

While FIGS. 1A and 1B show the patterning being performed on a single substrate surface, it is understood that embodiments of the device can be fabricated by performing the patterning on the surfaces of two substrates 11, after which the two surfaces are arranged to be facing each other. In this case, the patterning of the respective surfaces can be configured to closely align with each other when the substrates 11 are aligned so that the surfaces are facing each other. Alternatively, embodiments can perform none or only some of the patterning on a substrate surface that forms the channels 13.

Figure 1C:
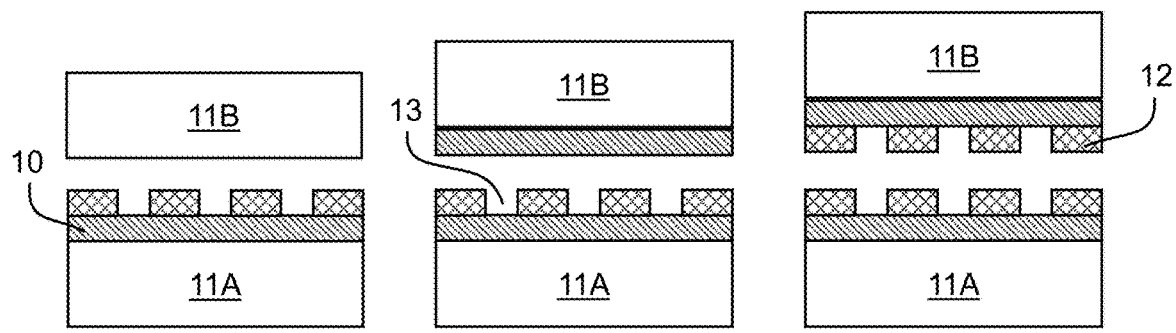
FIG. 1C shows illustrative configurations of substrate sandwiches forming the channels according to embodiments.
Figure 1C:
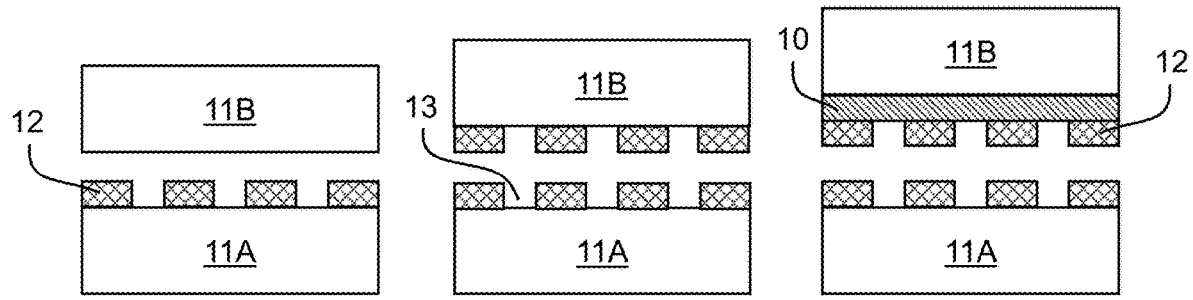

To this extent, FIG. 1C shows illustrative configurations of substrate (e.g., glass plate) sandwiches forming the channels 13 according to embodiments. In each embodiment, an upper substrate 11B is aligned above a lower substrate 11A to form channels therebetween. In each case, the lower substrate 11A is shown including a structure formed according to an embodiment shown in FIG. 1A or FIG. 1B. However, the upper substrate 11B is shown including either only the substrate 11B, only the substrate and the hydrophilic coating 10 shown in FIG. 1A, or a structure formed according to an embodiment shown in FIG. 1A or FIG. 1B. As illustrated, embodiments of the substrate sandwich can include an upper substrate 11B and a lower substrate 11A formed using any combination of different approaches. As used throughout the drawings, it is understood that references to "lower" and "upper" and "above" and "below" are only in reference to the manner in which the corresponding structures are illustrated in the drawing, and the invention is not limited to any particular orientation.

Additionally, while the upper substrate 11B structure is shown spaced from the lower substrate 11A structure with an air gap therebetween to form the channels 13, it is understood that some or all of the two structures can contact each other.

Figure 2A:
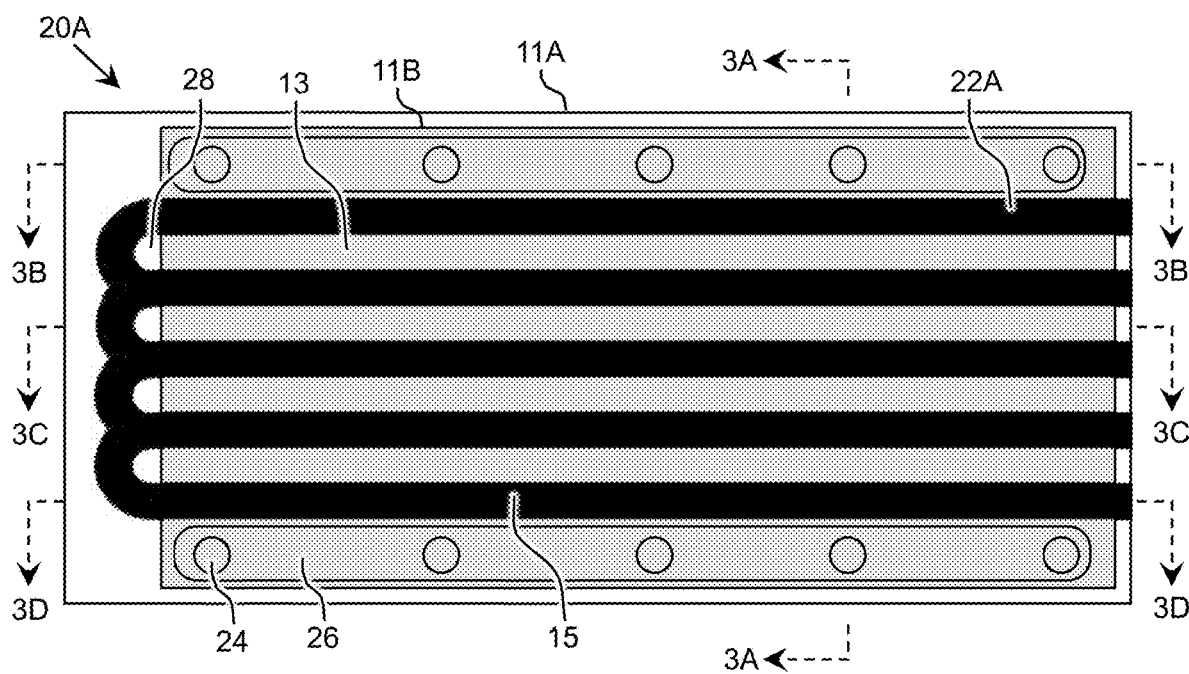
FIGS. 2A and 2B show top views of illustrative cartridges according to embodiments.
Figure 2B:
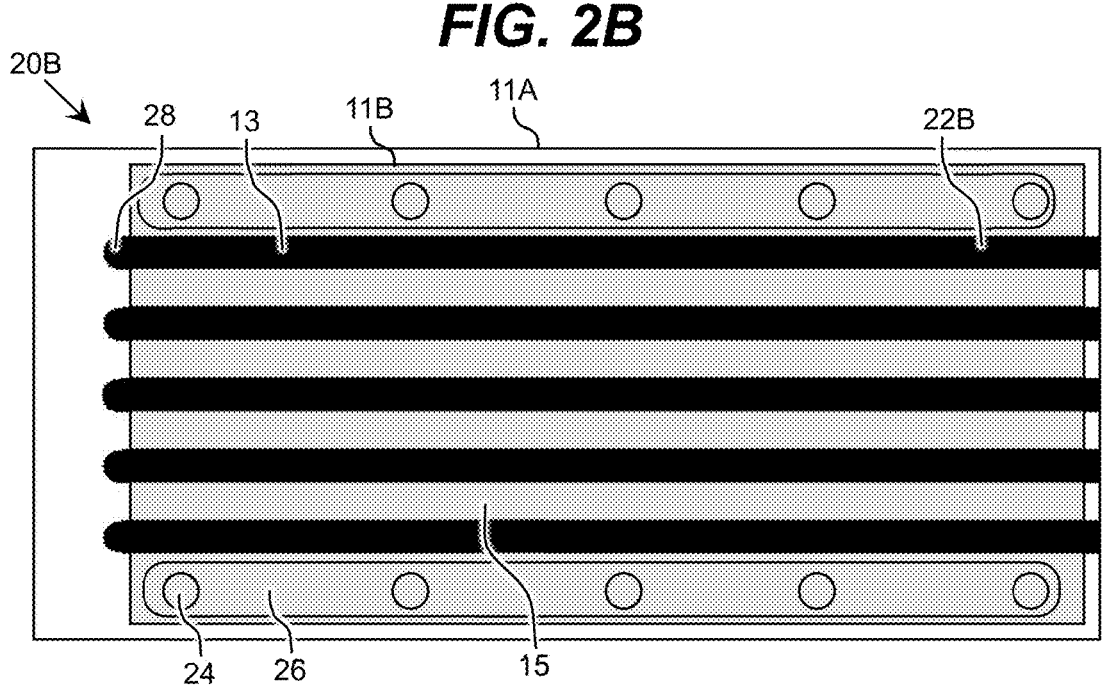

FIGS. 2A and 2B show top views of illustrative cartridges 20A, 20B according to embodiments, where the rectangular shaded region represents the presence of the upper substrate 11B, and the black regions represent coatings 22A (FIG. 2A), 22B (FIG. 2B) on the upper and/or lower substrates 11A, 11B, while FIGS. 3A-3D show cross-sections at different locations of the cartridge 20A shown in FIG. 2A according to embodiments.

As illustrated, each cartridge 20A, 20B includes a plurality of channels 13 formed between a lower substrate 11A and an upper substrate 11B. In an embodiment, each substrate 11A, 11B can comprise glass. In the cartridge 20A, each channel 13 is defined as a region of the substrates 11A, 11B that is not covered by a layer of barrier forming material 22A, such as a photoresist, which is used to form barriers 15 on either side of each channel 13. In the cartridge 20B, each channel 13 is defined as a region of the substrates 11A, 11B that is covered by a layer of channel forming material 22B, such as a hydrophilic coating, which are separated from one another by regions of the substrates 11A, 11B that are not covered by the material, thereby forming barriers 15 on either side of each channel 13. Regardless of how they are formed, each barrier 15 can have a sufficient thickness to prevent the liquid from leaving the channel 13, e.g., by flowing through the barrier 15.

Figure 3A:
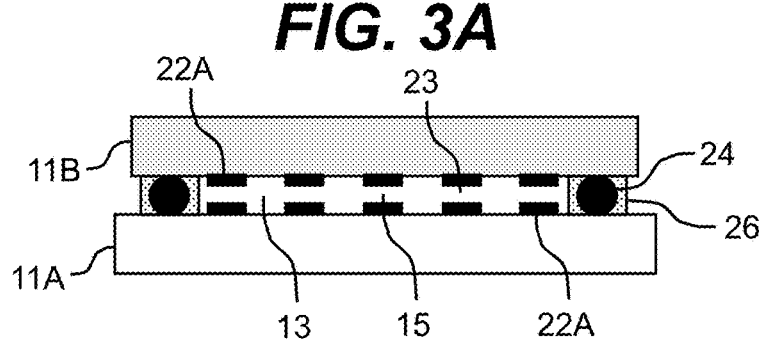
FIGS. 3A-3D show cross-sections at different locations of the cartridge shown in FIG. 2A according to embodiments.

As shown most clearly in FIG. 3A, in an embodiment, the layers of barrier forming material 22A formed on the substrates 11A, 11B do not contact each other, such that there is an air gap 23 located therebetween. In this case, each barrier 15 includes opposing layers of barrier forming material 22A separated by the air gap 23. However, it is understood that this is only illustrative, and embodiments of the channel device 20A comprise one or more layers of barrier forming material 22A, which form a physical barrier for an entirety of a distance between the interior facing surfaces of the substrates 11A, 11B. Additionally, it is understood that embodiments of the channel device 20A can comprise a barrier formed of a layer of barrier forming material 22A formed on only one of the substrates 11A, 11B, which may or may not contact the interior surface of the other substrate 11A, 11B, and therefore may or may not include an air gap 23.

Figure 3B:
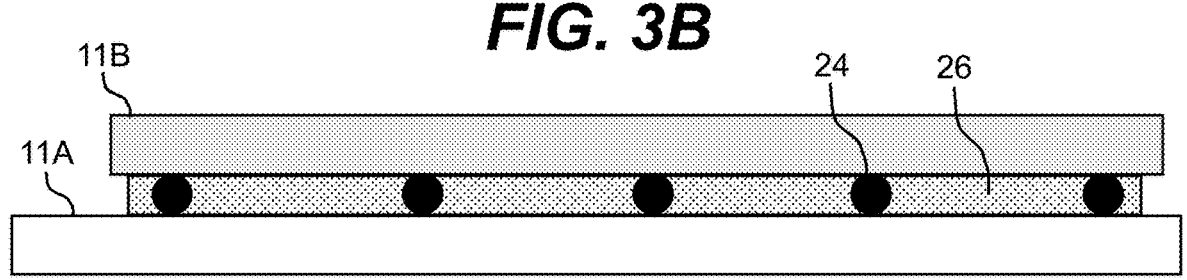

A spacing between the interior surfaces of the substrates 11A, 11B can be maintained using a set of spacers 24. For example, the spacers 24 can comprise ball spacers. The ball spacers 24 can precisely control the distance between the upper substrate 11B and the lower substrate 11A. Ball spacers 24 are available commercially with diameter tolerances on the order of micrometers. The spacers 24 can be arranged periodically along opposing sides of the channel device 20A, 20B. The spacers 24 can be held in place by an adhesive layer 26. As illustrated in FIG. 3B, the adhesive layer 26 can contact both substrates 11A, 11B. In this case, the adhesive layer 26 bonds the upper substrate 11B to the lower substrate 11A and encapsulates or bonds the spacers 24 so that they remain in place. However, it is understood that this is only illustrative, and embodiments can include an adhesive layer located on each substrate 11A, 11B which does not contact the other substrate 11A, 11B as shown in conjunction with the layers of barrier forming material 22A. Furthermore, embodiments can use a magnetic attraction (e.g., to one or both substrates 11A, 11B) to hold the spacers 24 in place, with or without the adhesive layer(s).

Figure 3C:
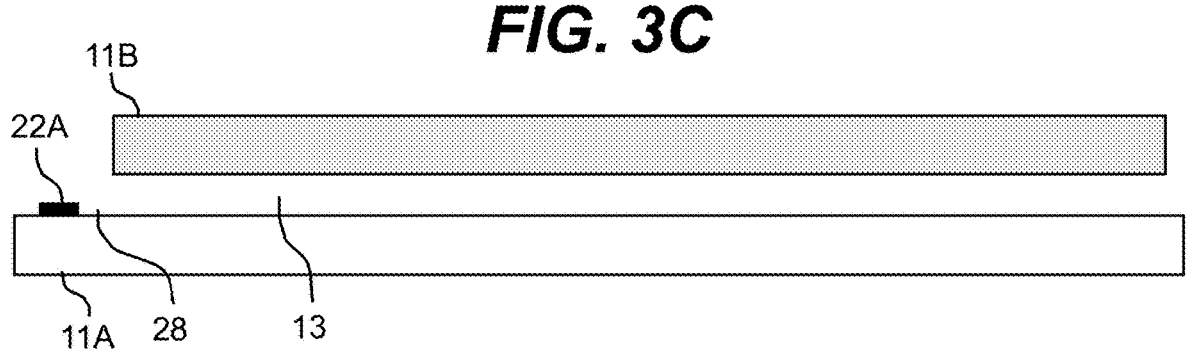
Figure 3D:
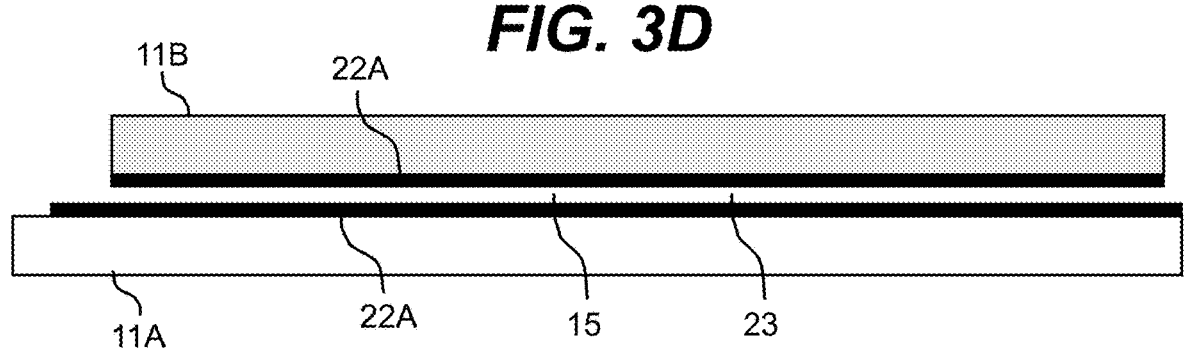

As illustrated, FIG. 3C corresponds to a cross-section along a channel 13 of the channel device 20A, while FIG. 3D corresponds to a cross-section along a barrier 15 defining and separating the channels 13. In this embodiment, the upper and lower extents of the channel 13 are shown being defined by the internal surfaces of the two substrates 11A, 11B. While not shown, it is understood that the cartridge 20B can have similar cross-sections as those shown for the cartridge 20A. However, a channel of the cartridge 20B will look similar to the cross-section of FIG. 3D, while the barrier between channels will look similar to the cross-section of FIG. 3C. Furthermore, it is understood that the upper and lower extents of the channel 13 and the barriers 15 can be formed using any solution described in conjunction with FIGS. 1A-1C.

Each cartridge 20A, 20B has a substrate 11A, which extends beyond an end of the other substrate 11B on at least one end. The area of the substrate 11A that extends beyond the other substrate 11B can comprise a deposition region 28 for each of the channels 13. Referring to FIGS. 2A and 2B, on each cartridge 20A, 20B, a size and shape of the deposition region 28 is defined by the barrier forming material 22A or the channel forming material 22B deposited on the substrate 11A in the area that extends beyond the other substrate 11B. As illustrated, each deposition region 28 can have a semi-circular shape. However, it is understood that such a shape is only illustrative and various other suitable shapes can be utilized.

The deposition region 28 provides a location to deposit liquid to be evaluated using the cartridge 20A, 20B, e.g., using a pipette or other dispenser. As the liquid is deposited, it spreads out in the deposition region 28 and contacts the proximal end of the upper substrate 11B at an entrance for the channel 13. The deposition region 28 can be fabricated to have a size that is selected based on a range of volumes of liquid to be analyzed using the corresponding channel 13. In particular, the deposition region 28 can have a size (lateral area) large enough for at least most of the liquid to be dispensed to fit within the deposition region 28 without overflowing the outer border of the deposition region 28. Additionally, the size of the deposition region 28 can be small enough that when the liquid is deposited in the deposition region and spreads out, it will definitely extend to the channel entrance in a layer at least as thick as the height of the channel 13 at the channel entrance. With the liquid touching the inner surfaces of both the lower and upper substrates 11A, 11B (or layers on the substrates 11A, 11B defining the channel 13 as with cartridge 20B), the ensuing capillary effect pulls all of the liquid from the deposition region 28 into the channel 13.

Figure 4A:
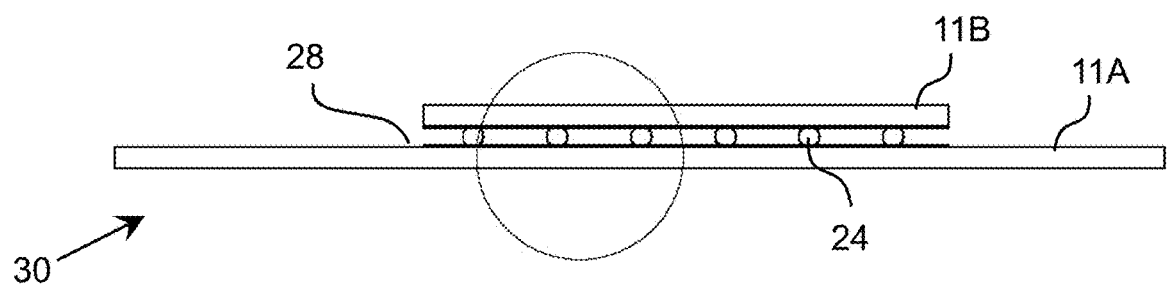
FIGS. 4A and 4B show side and detailed side views, respectively, of another illustrative cartridge according to an embodiment.
Figure 4B:
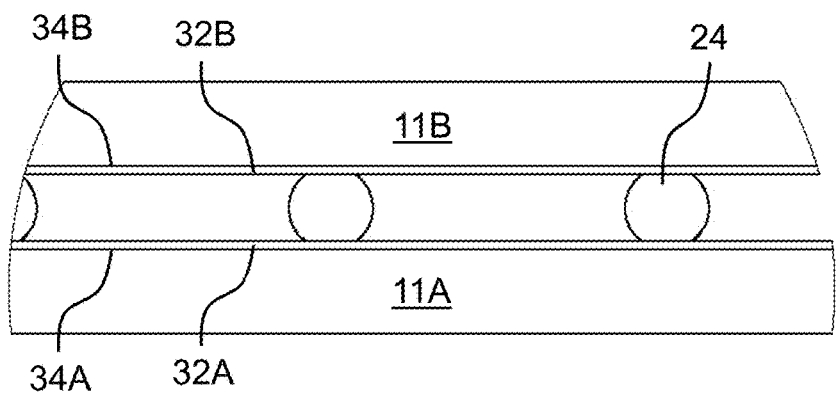

FIGS. 4A and 4B show side and detailed side views, respectively, of another illustrative cartridge 30 according to an embodiment. As illustrated, the separation distance between a bottom substrate 11A and a top substrate 11B can be maintained using a plurality of structures, such as ball spacers 24 located between the outer lateral sides of the substrates 11A, 11B as shown in FIGS. 2A and 2B. It is understood that structures, such as the ball spacers 24 can be located anywhere between the substrates 11A, 11B where the channels 13 are not present. In the illustrated embodiment, the ball spacers 24 can be partially embedded in a coating 32A, 32B applied to an internal facing surface 34A, 34B of each substrate 11A, 11B. In an embodiment, the coating 32A, 32B can be the same material as a coating that defines the lateral extent of the channels 13. The coating 32A, 32B can comprise a material that the ball spacers 24 penetrate to contact the corresponding substrates 11A, 11B. In this manner, the separation distance between the substrates 11A, 11B, and therefore the corresponding depth of the channels 13, can be accurately controlled. Alternatively, the coating 32A, 32B can include openings, holes, or other regions where there is no coating and the ball spacers 24 can be placed in these areas to define the separation distance without any potential effects from the coating 32A, 32B.

As illustrated most clearly in FIG. 4B, the internal facing surface 34A, 34B of each substrate 11A, 11B can include a coating 32A, 32B, respectively. The coatings 32A, 32B can provide a hydrophobic (for aqueous liquids) or lipophobic (for oil-based liquids) surfaces, which prevent the liquid from spreading across their surfaces. To this extent, as illustrated in FIG. 4B, the coatings 32A, 32B do not need to contact each other to provide a physical barrier across an entire depth of the channels 13. While the cartridge 30 is shown including repellant coatings 32A, 32B with internal facing surfaces having an affinity for the liquid, it is understood that an embodiment of the cartridge 30 can include coatings having an affinity for the liquid with internal facing surfaces 34A, 34B that repel the liquid. For example, for an aqueous solution, the substrates 11A, 11B can be plastic, coated in regions to be hydrophilic, and/or the like.

Regardless, the coatings 32A, 32B can be patterned extremely accurately using current technology, such as a photoresist, patterned using photolithography, etc. One or both of the coatings 32A, 32B can be transparent, opaque, or translucent. Additionally, misalignment of the coatings 32A, 32B deposited on the opposing internal facing surfaces 34A, 34B of the substrates 11A, 11B can be determined. For instance, for translucent coatings 32A, 32B, the regions where the coatings do not overlap will not appear as dark as regions where they do overlap. For opaque coatings 32A, 32B known to be patterned very accurately, a difference between a measured lateral width of a transparent region versus the known patterned width (e.g., 1.9 mm versus 2.0 mm) can be presumed to be the result of misalignment (e.g., 0.1 mm). A measurement system (e.g., the computer system 156 shown in FIG. 18) can employ a compensation technique to accurately estimate the hidden volume of liquid. The measurement system can employ similar compensation solutions for transparent and translucent coatings.

Figure 5:
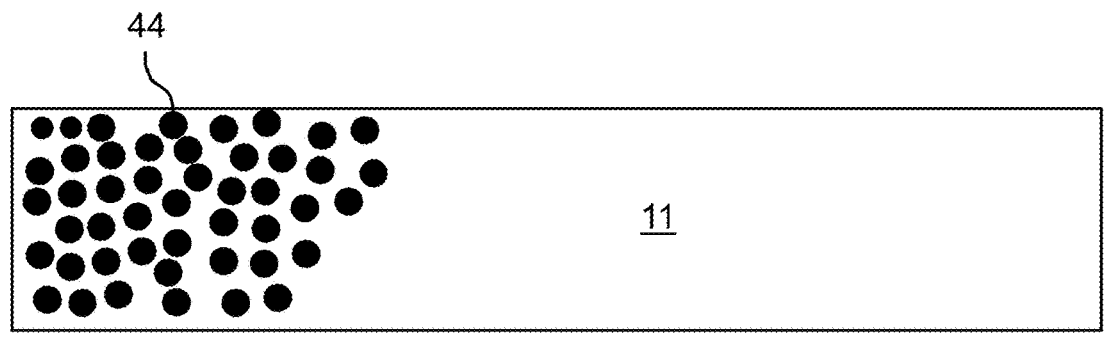
FIG. 5 shows an illustrative substrate with a plurality of structures formed thereon according to an embodiment.

While the channels 13 have been shown and described as being defined by one or more contiguous layers of material, it is understood that a channel 13 can be defined using any of various suitable solutions. To this extent, embodiments of the device can incorporate one or more additional features to increase hydrophobicity of the regions located between the channels 13. For example, a device described herein can include one or more geometric features that result in a higher hydrophobicity for such regions. In an embodiment, a channel 13 is defined by multiple distinct structures of material. For example, FIG. 5 shows an illustrative substrate 11 with a plurality of structures 44 formed thereon according to an embodiment. In an embodiment, the structures 44 are formed from a photoresist layer, which is patterned to create the structures 44.

In FIG. 5 the patterned portion of the substrate 11 can form a barrier, while the unpatterned portion comprises a portion of a channel. The patterned surface can include structures 44 which can have any of various cross-section shapes, such as elliptical (e.g., circular), rectangular (e.g., square), hexagonal, etc. In an embodiment, the structures 44 comprise slender pillars of 20 nanometer to 40 microns in diameter or width. Each structure 44 can be uniform throughout its height or tapered. By creating such pillars 44, e.g., as a repeating array in the photoresist layer, the hydrophobicity in the barrier region can be increased. In particular, a pattern of such pillars 44 can form a super hydrophobic barrier in which the contact angle of a droplet of water would be 120 degrees or greater.

Figure 6A:
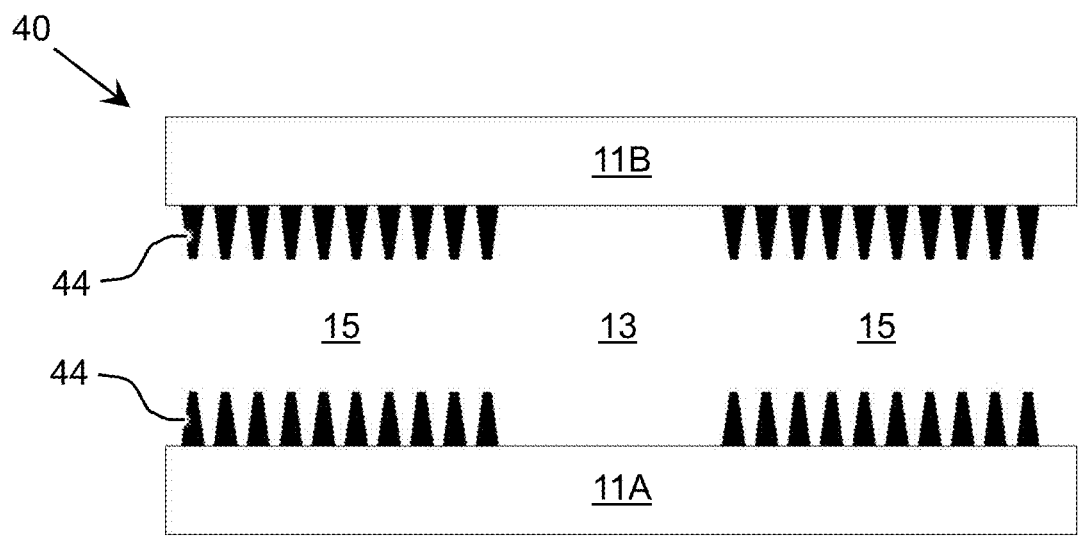
Figure 6B:
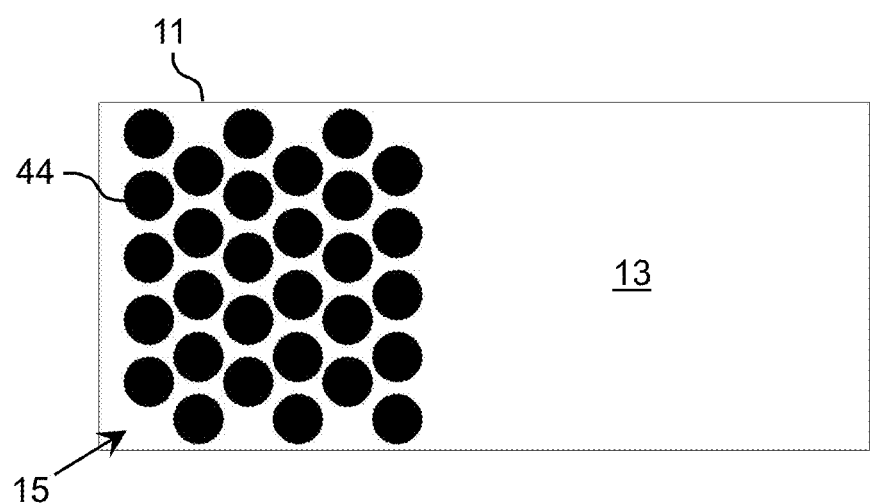
FIG. 6B shows a more detailed top view of an illustrative arrangement of structures on a substrate according to an embodiment.

FIG. 6A shows a cross-section view of an illustrative cartridge 40 including a channel 13 formed between super hydrophobic barriers 15 according to an embodiment, while FIG. 6B shows a more detailed top view of an illustrative arrangement of structures 44 on a substrate 11 according to an embodiment. As illustrated, the lateral extent of the channel 13 is defined by a plurality of slender pillars 44, which collectively form a super hydrophobic barrier 15. As illustrated, the super hydrophobic barrier 15 can comprise slender pillars 44 which are closely spaced and have a regular arrangement. Alternatively, the slender pillars 44 can have an irregular arrangement as shown in FIG. 5. The slender pillars 44 can be formed using any standard technique and can have a spacing and height for creating a super hydrophobic surface. In an embodiment, the deposition region 28 also can be formed by the plurality of pillars 44.

In an embodiment, a cartridge described herein can be configured for use in conjunction with a liquid evaluation device, which also includes stand, a frame, and/or the like. A base of the stand or frame can be configured to position the cartridge in any desired orientation. The cartridge can be removably held in the stand or frame to allow reuse of the stand or frame for different cartridges. Alternatively, the cartridge and stand or frame can be permanently attached and configured only for use together.

Figure 7:
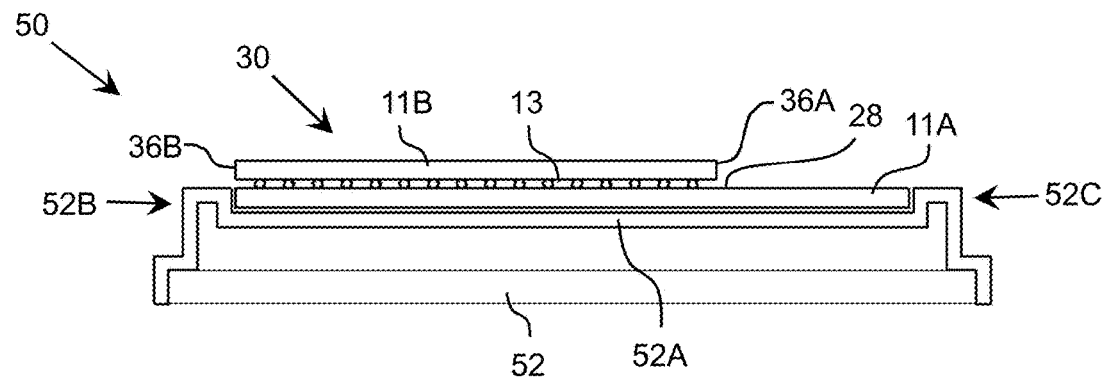
FIG. 7 shows an illustrative liquid evaluation device including a cartridge and a corresponding stand according to an embodiment.

FIG. 7 shows an illustrative liquid evaluation device 50 including a cartridge, such as a cartridge configured similar to the cartridge 30 of FIGS. 4A and 4B, and a corresponding stand 52 according to an embodiment. The stand 52 can be configured to position the multichannel cartridge 30 in a desired orientation so that the liquid can be dispensed and evaluated. In an embodiment, the stand 52 is configured to position the cartridge 30 in a substantially horizontal orientation. The device 50 comprises a stand 52 that is configured to position the cartridge 30 in a substantially horizontal orientation. In this case, the channel(s) 13 of the cartridge 30 that extend between the proximal and distal ends 36A, 36B, respectively, of the upper plate 11B can be substantially horizontal (e.g., except for any tapering, if present, as described herein).

The stand 52 can position the cartridge 30 using any solution. For example, the stand 52 can be configured such that the cartridge 30 can be laterally inserted into a desired position. In this case, the stand 52 can include a base formed of a recessed mounting region 52A located between two protruding areas 52B, 52C, which direct the cartridge 30 into position. However, it is understood that this is only illustrative of numerous solutions for positioning the cartridge 30 using the stand 52. Other solutions can insert the cartridge 30 from the top, bottom, front, back, and/or the like. Additionally, the stand 52 and cartridge 30 can be configured to secure the cartridge 30, e.g., using a catch or fastener, which can secure the cartridge 30 (e.g., the lower plate 11A of the cartridge 30) in position and can allow the cartridge 30 to be removed from the stand 52 when desired. Regardless, the stand 52 and cartridge 30 can be sized so that the cartridge 30 is appropriately positioned when inserted into the stand 52 and abutting a mechanical stop. Additionally, the stand 52 and cartridge 30 can include one or more features (e.g., complementary shapes, visual indicators, and/or the like) that ensure that the cartridge 30 is inserted into the stand 52 with the deposition regions 28 for the channels 13 located in the correct position.

The stand 52 can be fabricated using any solution. For example, the stand 52 can comprise one or more molded plastic parts or machined parts, which can be permanently or temporarily secured to each other using any of various solutions or fabricated using 3D printing. Embodiments of the stand 52 can be configured to secure the cartridge 30 (e.g., the lower plate 11A of the cartridge 30) at any angle with respect to horizontal. An illustrative range of angles are between −15 and +15 degrees from horizontal. In an embodiment, the stand 52 can be configured to enable the cartridge 30 to be secured at either an upward (positive) angle or a downward (negative) angle.

Figure 8A:
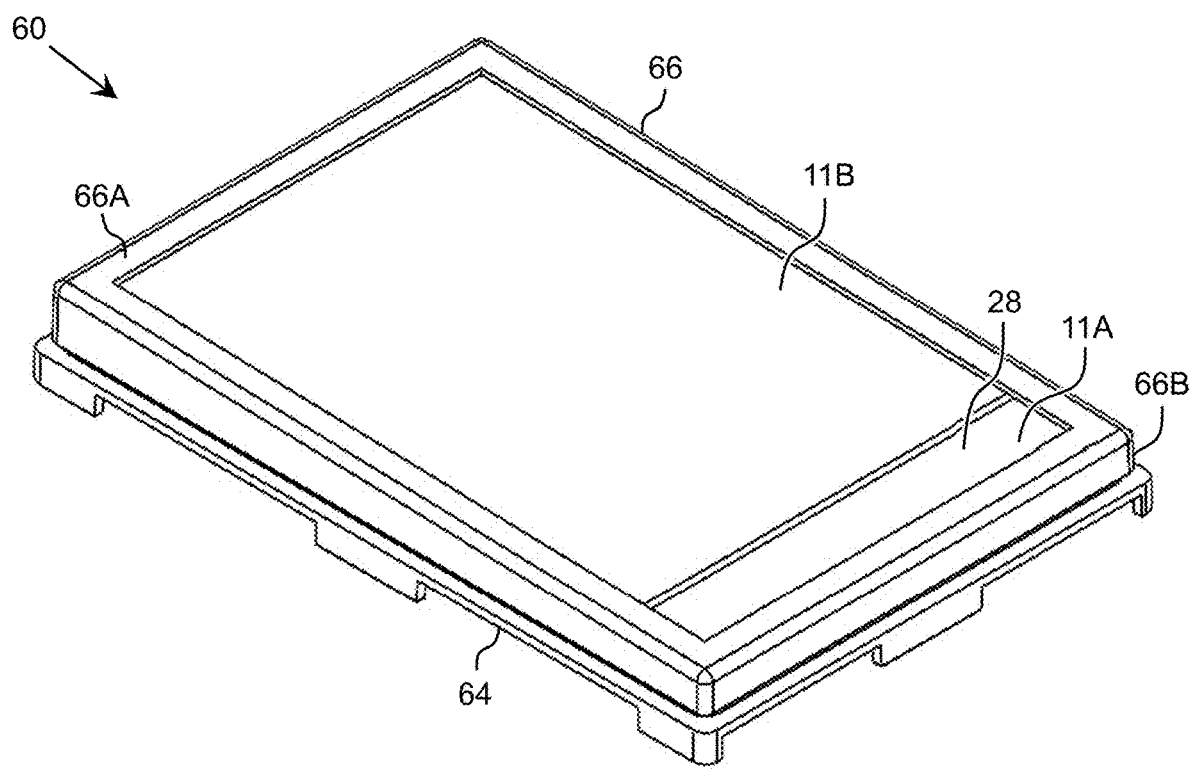
FIGS. 8A-8C show a perspective, cross-sectional, and exploded view, respectively, of an illustrative liquid evaluation device including a frame in which a cartridge described herein is mounted according to an embodiment.
Figure 8B:
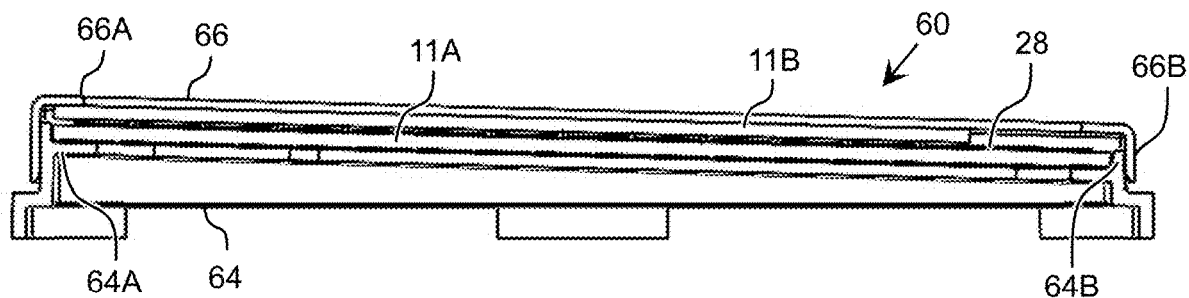
Figure 8C:
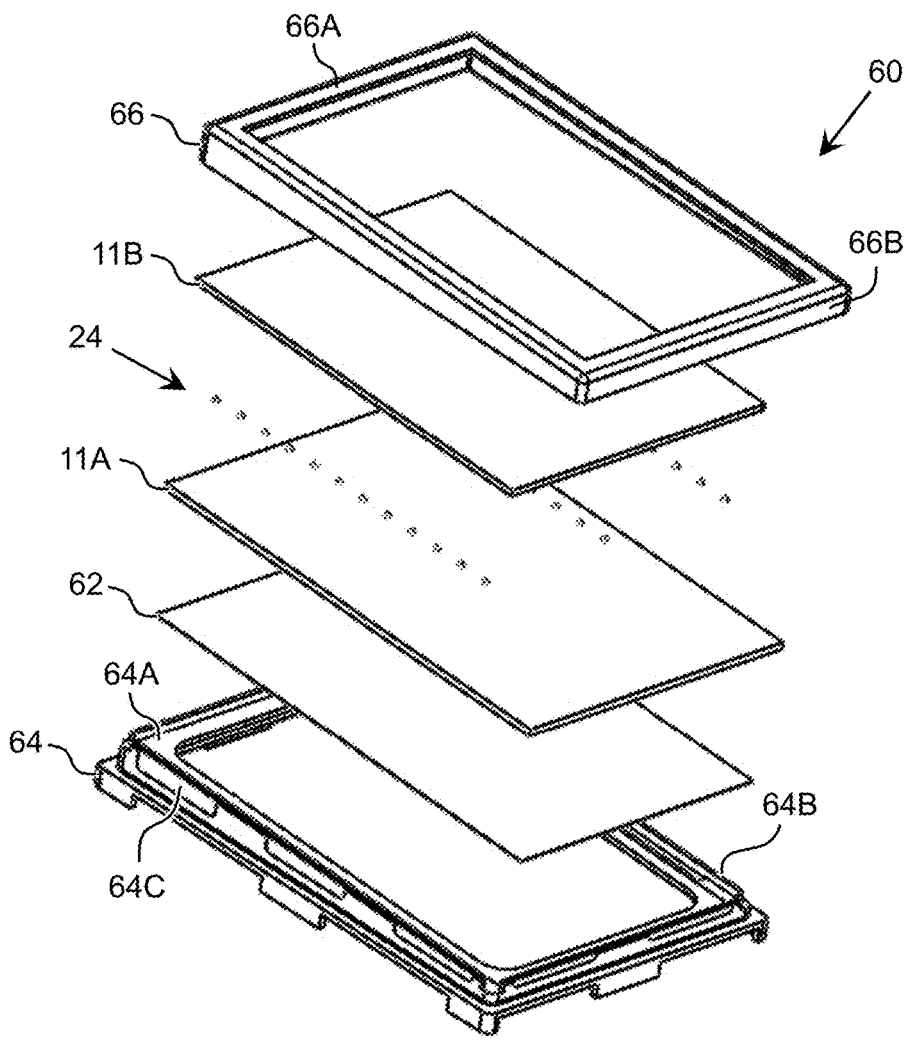

FIGS. 8A-8C show a perspective, cross-sectional, and exploded view, respectively, of an illustrative liquid evaluation device including a frame 60 in which a cartridge described herein is mounted according to an embodiment. In the drawings, the channels and barriers formed between the substrates 11A, 11B are not illustrated. However, it is understood that the channels and barriers can be formed using one or more of any of the various solutions described herein. Spacing between the substrates 11A, 11B can be maintained using a solution described herein, such as the ball spacers 24 shown in FIG. 8C. In an embodiment, the liquid evaluation device 60 can be configured such that the channels are positioned with the deposition region 28 and channel entrance region at a lower end of the top substrate 11B, with the channels angled slightly upward. Liquid deposited at this location will enter the channel and travel upward into the channel.

As illustrated most clearly in FIG. 8C, the device 60 can include a background layer 62, which is configured to provide a desired background for the cartridge (e.g., when the cartridge is fabricated using glass or another transparent material). For example, the background layer 62 can be configured to provide a consistent, contrasting (e.g., white) background under the substrates 11A, 11B. Such a configuration can be used, for example, when liquid deposited into the cartridge for evaluation has a color, such as a liquid dye.

The background layer 62 can be fabricated using any solution. For example, the background layer 62 can be paint applied to an underside of the lower substrate 11A, a label adhered to the underside of the lower substrate 11A, cardstock, etc. In an embodiment, the background layer 62 can include markings which are visible through the substrates 11A and/or the substrate 11B. Such markings can communicate any type of information, such as information regarding a version of the cartridge, one or more volume measurements, etc. The markings can be formed by paint or a coating, affixed, engraved, engraved and backfilled, and/or the like. The markings can be included on an outer surface of a substrate, such as the lower substrate 11A, e.g., in areas corresponding to the channels, and can be present with or without a background layer 62. The markings also can be formed by a coating in the channel.

The device 60 can comprise a base 64 and a cover 66 secured thereto, which are configured to secure a cartridge described herein and/or the background layer 62 in a desired manner between the base 64 and the cover 66. To this extent, the base 64 is shown including a base ledge 64A, a base lip 64B, and a base lip recess 64C, while the cover 66 is shown including a cover ledge 66A and a cover perimeter wall 66B.

The base 64 and cover 66 each can be fabricated using any solution. For example, the base 64 and/or the cover 66 can be an injection molded plastic part. The cover 66 can be configured to fit over the base 64, with the cover perimeter wall 66B, fitting around the base lip 64B, to center the cover 66 to the base 64. The cartridge, including the substrates 11A, 11B, and the background layer 62 can be configured to fit within the base lip 64B and be supported by the base ledge 64A. The base lip 64B, cover ledge 66A, and the cover perimeter wall 66B secure and hide the edges of the substrate 11A, 11B.

The cartridge can be secured to the base 64 and/or the cover 66 using any solution. For example, one or more areas of one or both substrates 11A, 11B can be secured to the base 64 and/or the cover 66 using an adhesive, pressure sensitive tape, and/or the like, which can be applied to the base ledge 64A and/or an interior facing surface of the cover ledge 66A. When the background layer 62 is not affixed to the substrate 11A (e.g., the background layer 62 is cardstock), the background layer 62 can be configured to rest on the base ledge 64A and be sized to be narrower than the lower substrate 11B, so that the lower substrate 11B can be bonded directly to the base ledge 64A. The cover 66 can be permanently or removably affixed to the base 64 using any solution, such as an adhesive applied in the base lip recesses 64C, a snap fit to the base 64, such as the base recesses 64C, etc.

It is understood that while the base 64 is illustrated as having an open central area, the base 64 can have any configuration of structure within the central area, if required to provide support, for example, to the background layer 62. For example, the base 64 could comprise an x-shaped support structure which extends from each of the corners of the base ledge 64A. In an embodiment, the cover ledge 66A can include an area, such as an end opposing the deposition regions 28, which is configured with information regarding the device 60 (e.g., a label or markings) and/or includes a structure that enables a human to provide information (e.g., a blank label that can be written on). Regardless, it is understood that the particular configuration of the base 64 and cover 66 shown is only illustrative of various configurations, which are possible in embodiments described herein.

In an embodiment, a cartridge described herein can include one or more liquid flow structures located in a deposition region for a channel, a channel entrance region of the channel, and/or within or along an interior region of the channel, which can be configured to facilitate liquid flow. The liquid flow can be designed to improve an accuracy of measurements of a volume of liquid present within the channel. Such an improved accuracy can be obtained by reducing a likelihood of liquid remaining in a space assumed to be vacated by the liquid and/or liquid not filling a space assumed to be filled by the liquid to obtain an accurate volume measurement. Additionally, an improved accuracy can be obtained by improving an ability to acquire accurate measurements of the volume of liquid present within the channel through one or more visual indications present in the volume of liquid. A liquid flow structure can comprise any type of formation, shape, attribute, etc., which alone or in conjunction with other similar liquid flow structures, encourages liquid flow in a desired manner, forms a region into which liquid can flow, etc. The liquid flow structure(s) can be configured to improve an accuracy of a measured volume of liquid in the corresponding channel.

Figure 9:
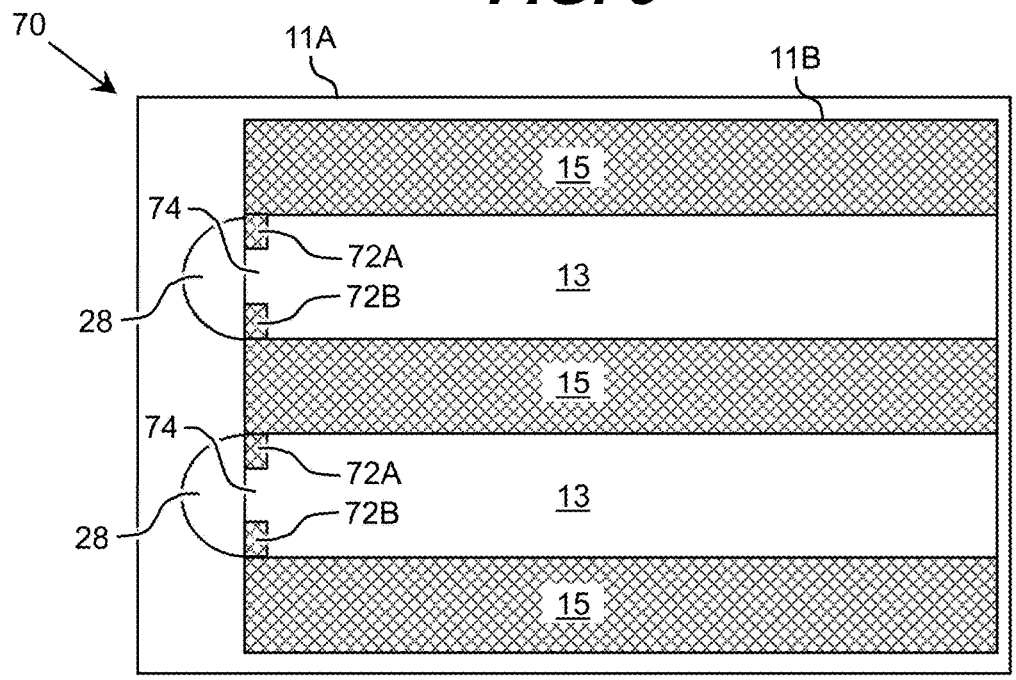
FIG. 9 shows an illustrative cartridge including liquid flow structures located in a channel entrance region of each channel according to an embodiment.

FIG. 9 shows an illustrative cartridge 70 including liquid flow structures 72A, 72B located in a channel entrance region of each channel 13 according to an embodiment. In an embodiment, the liquid flow structures 72A, 72B can be formed from a photoresist layer deposited on an internal facing surface of one or both substrates 11A, 11B. As described herein, each channel 13 can be defined by barriers 15, e.g., which also can be formed by one or more photoresist layers. However, it is understood that the channels 13 can have any shape or configuration and one or more additional materials can be used to define the channels 13, barriers 15, and/or liquid flow structures 72A, 72B as described herein.

Regardless, the entrance region of each channel 13 is shown including liquid flow structures 72A, 72B forming a gate 74 adjacent to the deposition region 28 at which the liquid is placed. Each gate 74 can be defined by one or more liquid flow structures 72A, 72B, each of which can be a small, thin strip of photoresist and/or hydrophobic material formed at the channel entrance. For example, the channel entrance can be located at the proximal end of an upper substrate 11B. The liquid flow structures 72A, 72B forming the gate 74 can be formed on the inner facing surface of the lower substrate 11A and/or the upper substrate 11B. The gate 74 includes an opening that provides a path for liquid to flow from the deposition region 28 into the corresponding channel 13. Once in the channel 13, the upper and lower surfaces of the channel 13 will attract the liquid more than the single lower surface of the deposition region 28, thereby pulling all of the liquid into the channel 13.

In an embodiment, the gate 74 can clearly define a start of a measurement zone of the channel 13. For example, by creating sufficiently thin (e.g., approximately 0.5 millimeters thick) liquid flow structure(s) 72A, 72B and providing a small (e.g., 1 to 2 millimeters) opening for the gate 74, the material forming the gate 74 will be unable to prevent the liquid from filling the channel 13. Once some liquid has flowed past the gate 74 into the channel 13, the remaining liquid can be pulled through the gate 74 and/or over or through the liquid flow structures 72A, 72B into the channel 13. Once all the liquid has entered the channel 13, the liquid flow structures 72A, 72B can act as a barrier to prevent the liquid from pooling in the channel entrance and/or deposition region 28. Furthermore, a trailing edge of the liquid can remain at the innermost edge of the liquid flow structures 72A, 72B, which can provide a highly accurate starting line for measurement of the volume of liquid in the channel 13.

In particular, additional accuracy can be obtained when a location of the trailing edge of the liquid is defined by the liquid flow structures 72A, 72B, which can be fabricated using a photolithography process rather than the cut edge of the proximal end of the upper substrate 11B.

While the gate 74 is shown including a single opening located in the central portion of the lateral extent of the channel 13, it is understood that this is only illustrative. For example, other embodiments can include a gate 74 formed by a single extension of material that extends from a first side of the channel 13 only partially to the opposing side of the channel 13. Furthermore, a gate 74 can comprise more than one opening through which liquid can pass. For example, a gate structure can include a single strip of material centrally located in the channel 13, which allows liquid to enter the channel 13 through openings located near the edges of the channel 13.

Figure 10:
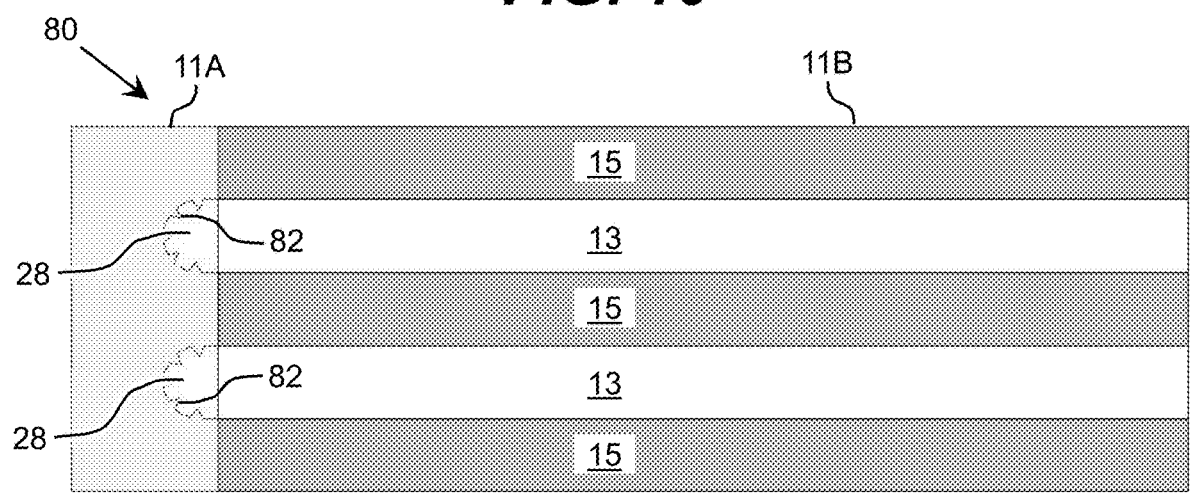
FIG. 10 shows an illustrative cartridge with deposition regions including liquid flow structures according to an embodiment.

In embodiments, the deposition region 28 of a channel 13 can include one or more structures to encourage liquid flow into the corresponding channel 13. For example, FIG. 10 shows an illustrative cartridge 80 with deposition regions 28 including liquid flow structures 82 according to an embodiment. In particular, each deposition region 28 can be defined by a repellant coating applied to a surface of the lower substrate 11A. The perimeter of the deposition region 28 can include liquid flow structures 82 in the form of repellant protrusions patterned from the repellant coating, each of which can have a shape, an orientation, and a spacing from adjacent protrusions to facilitate flow of the liquid in a direction of the entrance of the channel 13.

During use, liquid deposited in the deposition region 28 may flow on top of the liquid flow structures 82 when additional space is needed to contain the liquid, however, as soon as the additional space is no longer needed, the liquid flow structures 82 will repel the liquid towards the entrance of the channel 13. The liquid flow structures 82 thereby enable the deposition region 28 to have some overflow space, yet encourage all of the liquid to enter the channel 13. While the liquid flow structures 82 are shown as triangles pointing towards a center of the deposition region 28, other shapes can be utilized, such as thin radial lines near the perimeter of the deposition region 28, protruding semicircular regions, and/or the like.

In embodiments, the interior region of the channel can include one or more liquid flow structures to encourage liquid flow in a particular direction and/or shape. Inclusion of such structures can be configured to make reading a volume measurement easier and/or more accurate. In embodiments, a photoresist or another layer of material can be further patterned to form the liquid flow structures in the channel.

Figure 11:
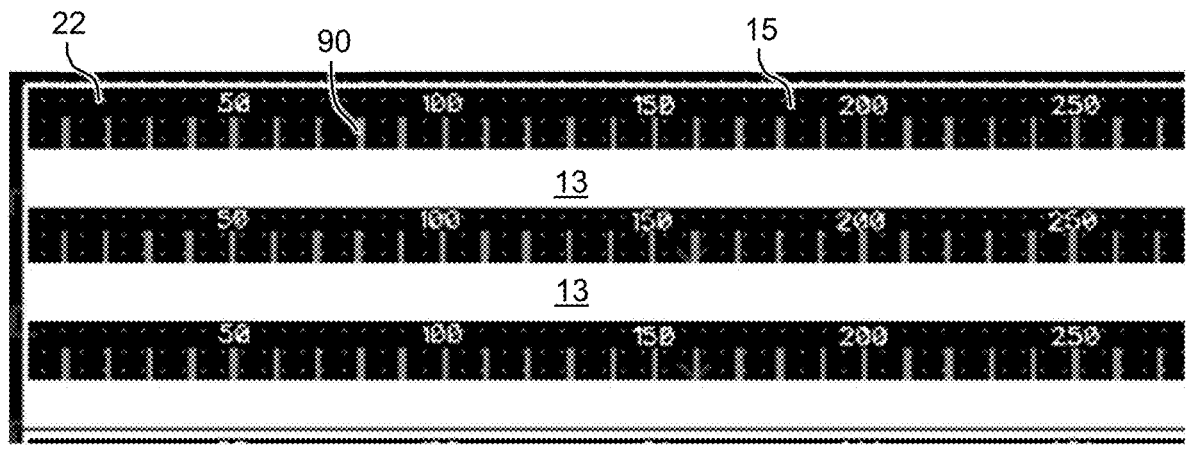
FIG. 11 shows an illustrative embodiment in which narrow lines are patterned into a coating defining the lateral extent of each channel.

FIG. 11 shows an illustrative embodiment in which thin lines 90 (e.g., tick marks) are patterned into a coating 22, e.g., a repellant coating such as a photoresist, forming the barriers 15 defining the lateral extent of each channel 13. The thin lines 90 can form graduations that can be used to assist in measuring a volume of liquid present in the corresponding channel 13, e.g., to sub-microliter accuracy. In an embodiment, the thin lines 90 can be patterned in the coating 22 (e.g., a photoresist layer) at the same time as the channels 13. The illustrated thin lines 90 can extend from the channel 13, but can be formed sufficiently thin that it is not energetically favorable for the liquid to fill these regions, particularly before the channel 13 fills with the liquid. Alternatively, the thin lines 90 can be located close to the channel 13, but separated therefrom by a relatively thin strip of the coating 22 forming the barrier 15.

Figure 12:
FIG. 12 shows an illustrative channel with fillable graduation marks located in a side thereof according to an embodiment.

As shown in FIG. 12, in another illustrative embodiment, liquid flow structures can include fillable graduation marks 92, which can be fabricated in a side of a channel 13. In this case, the graduation marks 92 can be formed in, for example, a coating, such as a photoresist, defining the lateral extent of the channel 13. Each graduation mark 92 can have a sufficient width such that the liquid will fill the graduation mark 92 as it moves down the channel 13, e.g., from left to right in FIG. 12.

Additionally, the channel 13 is shown having a relatively wide initial area 13A, which can contain a larger volume of liquid, followed by a relatively thin reading area 13B, which includes the fillable graduation marks 92 (e.g., ticks) spaced thereon. A graded transition region can provide a transition between the initial area 13A and the reading area 13B. The graduation marks 92 can be fabricated to have a width that is at least as wide or wider than the thinned channel 13B so that the liquid is encouraged to enter the graduation mark 92 as it flows through the channel 13.

In an embodiment, a channel can include a combination of fillable and non-fillable graduation marks, which can provide features to assist with measuring on two different scales. For example, an embodiment of a channel can include fillable graduation marks 92 as shown in FIG. 12, which are spaced at a first larger scale. Additionally, one or more thin lines, such as the thin lines 90 shown in FIG. 11, can be located between the fillable graduation marks 92, to provide visual indications of volumes at a second smaller scale.

In an embodiment, a background of the channel 13 can have a solid color, such as white, and the liquid can comprise a dye or the like, having a different color, such as red. In this case, as the liquid fills the main channel 13 and flows into a corresponding graduation mark 92, the color of the graduation mark 92 will change from the background color to the color of the liquid. Such a change can make it easier to identify how far the liquid has filled the channel 13. As illustrated, each graduation mark 92 can have a shape that is more rounded than square. For example, each graduation mark 92 can be formed as a branch having a semi-circular end protruding from the channel 13. Geometric calculations for the volume of liquid that can enter each of the graduation marks 13 can be important for accuracy of the liquid measurements. To this extent, sharp corners may not end up completely filling due to fluid dynamics, leaving them approximately 90% full and throwing off the accuracy of volume readings. As a result, the rounded shapes can improve the accuracy of the volume readings.

Figure 13A:
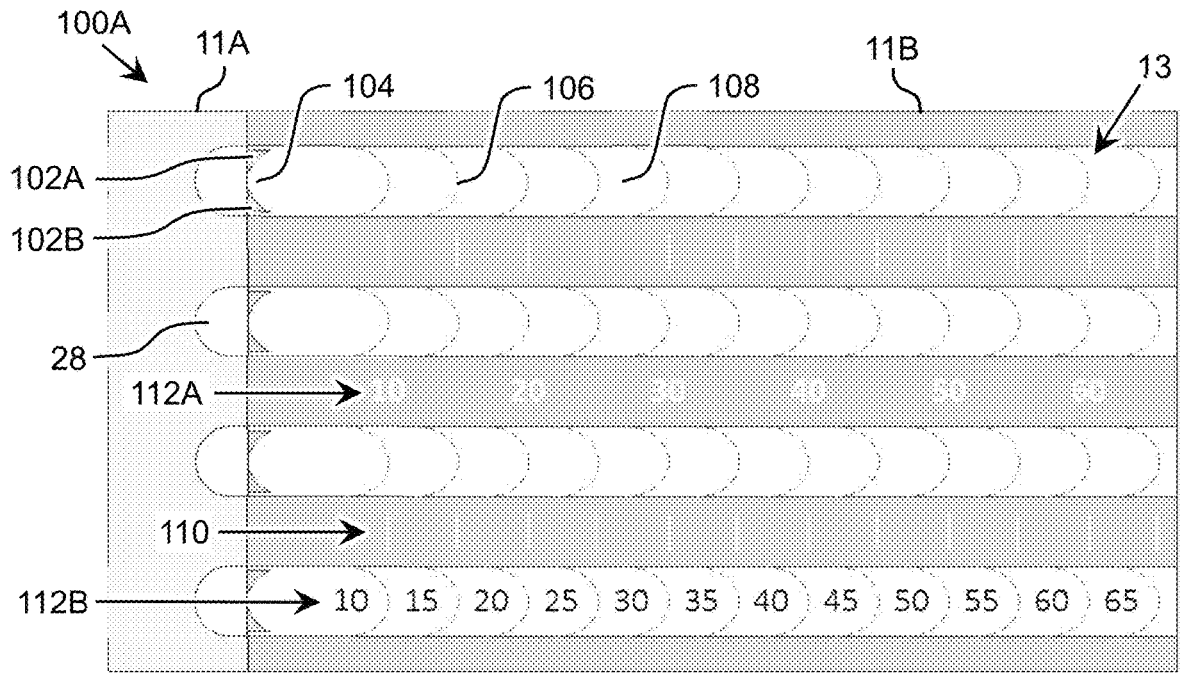
Figure 13B:
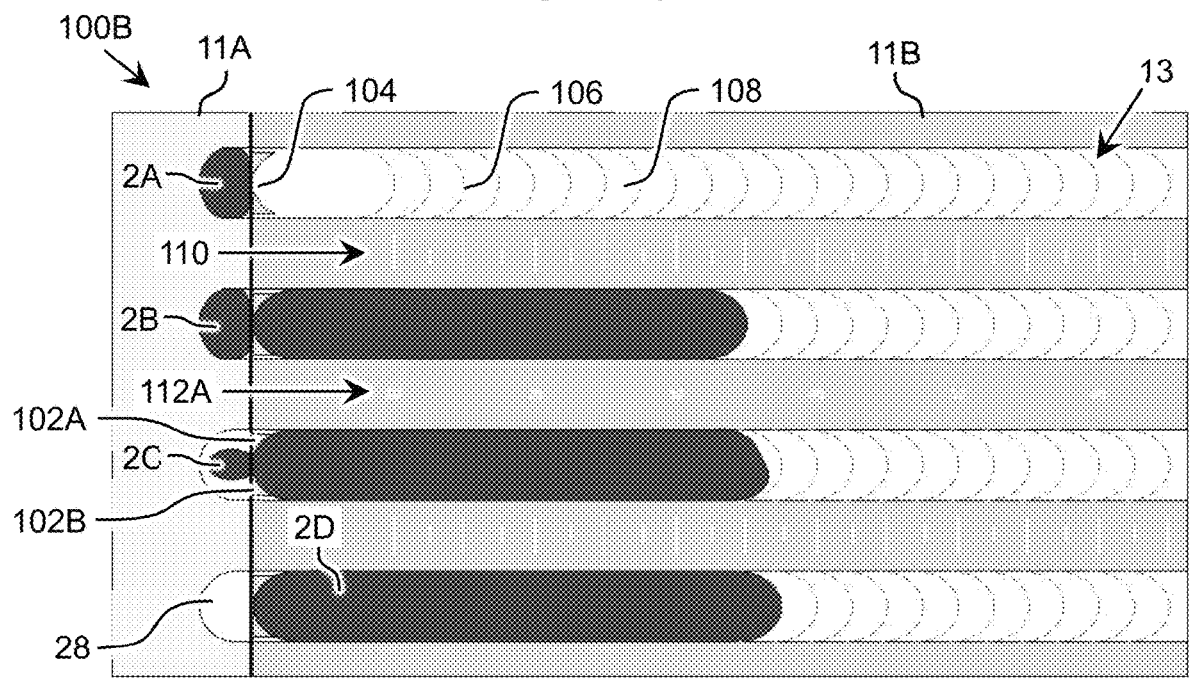
FIG. 13B illustrates a top view of a similar illustrative cartridge with liquid columns at different stages as they move through the channels of the cartridge.

Embodiments of a cartridge described herein also can include one or more liquid flow structures configured to shape the liquid column within the channel 13. For example, FIG. 13A shows a top view of an illustrative cartridge 100A including liquid flow structures for shaping the liquid column within the channels 13 according to an embodiment, while FIG. 13B illustrates a top view of a similar illustrative cartridge 100B with liquid columns 2A-2D at different stages as they move through the channels 13 of the cartridge 100B.

Each cartridge 100A, 100B is shown including gate structures 102A, 102B at the entrance region of each channel 13. The gate structures 102A, 102B form a gate 104 adjacent to the deposition region 28 at which the liquid volume 2A-2D is placed. The gate structures 102A, 102B and gate 104 can be fabricated and function similar to the gate structures and gate shown and described in conjunction with FIG. 9, e.g., by depositing a photoresist layer on an internal facing surface of one or both substrates 11A, 11B. However, each gate structure 102A, 102B is configured to shape a trailing edge of the liquid volume 2A-2D in the channel 13. In particular, as illustrated most clearly by the liquid volumes 2B-2D, an interior side of each gate structure 102A, 102B is configured to cause the trailing edge of the liquid volume 2A-2D in the channel 13 to have a rounded shape. To this extent, each gate structure 102A, 102B can have a triangular shape. In a more particular embodiment, the triangular shape of each gate structure can have a side aligned with the entrance region of the channel 13, a side aligned with the lateral side of the channel 13, and an interior facing side of the triangular shape being rounded inward.

Within an interior region of the channel 13, each cartridge 100A, 100B is shown including a plurality of weirs 106, which form a plurality of consecutive weir chambers 108 along a length of the channel 13. Each weir 106 comprises a small obstruction that resists the flow of the liquid volume 2A-2D. As a result, the liquid volume 2A-2D will tend to fill behind each weir 106 before bypassing it. As illustrated most clearly by the liquid volumes 2B-2D, the liquid volume 2A-2D will not partially enter a weir chamber 108 until the previous weir chamber 108 has been completely filled.

Each weir 106 can be shaped to cause a leading edge of the liquid volume 2A-2D to form a shape that the leading edge of the liquid volume 2A-2D naturally wants to form in the channel 13. For example, as illustrated, each weir 106 can cause the liquid volume 2A-2D to form a rounded leading edge. As a result, each weir 106 can create an obstruction that has a rounded shape. In an embodiment, each weir 106 can comprise a thin line of a hydrophobic coating, which can be applied on an internal facing surface of the lower substrate 11A, upper substrate 11B, or both. In an embodiment, each weir 106 is formed of one or more thin lines of coating having a width in a range of 1 micron to 200 microns. In a more particular embodiment, a width of each thin line forming a weir 106 is in a range of 1 micron to 50 microns. In a still more particular embodiment, a width of each thin line forming a weir 106 is in a range of 10 micron to microns. Additionally, as illustrated, a weir 106 can include one or more breaks in the line, which can help the liquid volume 2A-2D bypass the weir 106 once the liquid volume 2A-2D has filled the corresponding weir chamber 108.

In an embodiment, the weirs 106, as well as the gate structure 102A, 102B, can enable more accurate volumetric readings of the liquid volume 2A-2D in the channel 13. To this extent, each weir 106 can be placed such that each weir chamber 108 corresponds to a particular volume of liquid. A particular volume of liquid for each weir chamber 108 can be selected based on a desired accuracy of the volume measurements. As illustrated, other than a first chamber formed by the gate structure 102A-102B and a first weir 106, each weir chamber 108 can correspond to an identical volume, such as five arbitrary units as shown for the cartridge 100A or two and a half arbitrary units as shown for the cartridge 100B. While the channel 13 is shown including weirs 106 substantially along an entire interior region of the channel 13, it is understood that a channel 13 can include weirs 106 only in a portion thereof, e.g., to accommodate a minimum and maximum range of volumes for which the channel 13 is configured to accurately measure.

Furthermore, a cartridge 100A, 100B can include graduations 110 and/or text 112A, 112B which can enable a user to read the volume of the liquid volume 2A-2D in the channel 13, e.g., similar to a person reading a mercury or alcohol thermometer. Graduations 110 and text 112A can be formed as regions without a repellant coating, thus if the repellant coating has color or is opaque, the graduations 110 and text 112A will appear clear. Alternatively, the text 112A can be formed on an inner or outer surface of the top substrate 11B, e.g., by paint or a coating, affixed, engraved, engraved and backfilled, and/or the like. As illustrated by the text 112B, text and/or graduations can appear within the channel 13, such as within a weir chamber 108 and can be formed by paint or a coating, affixed, engraved, engraved and backfilled, and/or the like, on any of the outer or inner surfaces of a substrate and/or a background layer located below the cartridge 100A, 100B. The text 112A, 112B is shown as numbers corresponding to volume measurements, however the text 112A, 112B also can include other information, such as symbols and/or information about the cartridge 100A, 100B, such as a serial number.

Figure 14:
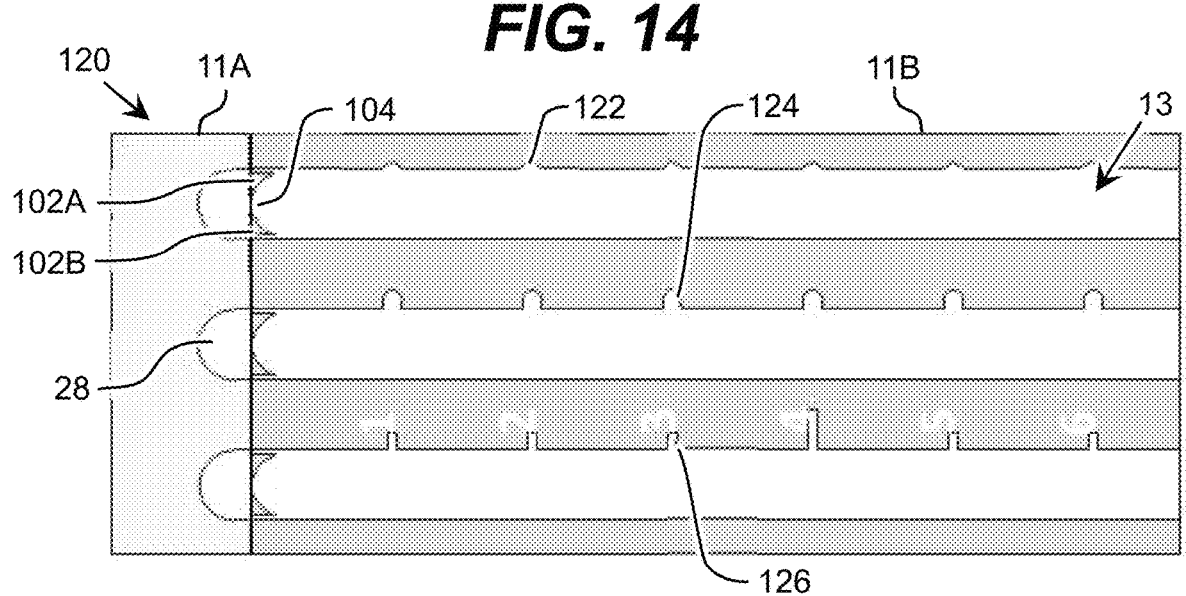
FIG. 14 shows a top view of an illustrative cartridge including multiple channels, each having a different illustrative configuration of liquid flow structures to assist in measuring a volume of a liquid in the channel according to embodiments.

FIG. 14 shows a top view of an illustrative cartridge 120 including multiple channels 13, each having a different illustrative configuration of liquid flow structures to assist in measuring a volume of a liquid in the channel 13 according to embodiments. In particular, a first channel 13 is shown having multiple periodically spaced small contiguous fillable graduations 122 located on a side of the channel 13. A second channel 13 is shown having multiple periodically spaced larger contiguous fillable graduations 124 located on a side of the channel 13. A third channel 13 is shown including multiple periodically spaced contiguous textual fillable graduations 126 located on a side of the channel 13. It is understood that embodiments of cartridges can include channels including any combination of two or more of the illustrated liquid flow structures.

In each case, the graduations 122, 124, 126 are formed as recesses in the channel 13 walls, e.g., by patterning a repellant coating to include the corresponding fillable graduations 122, 124, 126. As the liquid fills the channel 13, it will also fill each fillable graduation 122, 124, 126. In this case of the textual fillable graduations 126, the liquid also can fill the text portion. By filling the text portion, which can correspond to a volume of the liquid at the corresponding location in the channel 13, a user can more readily read a volume of the liquid in the channel 13.

Figure 15A:
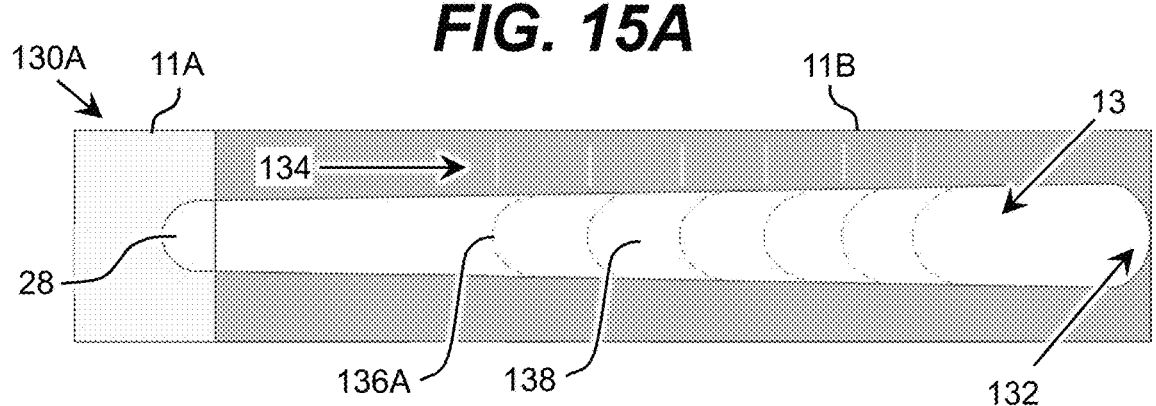
FIGS. 15A and 15B show top views of illustrative cartridges, each with a channel having an increasing cross-sectional area and a decreasing cross-sectional area, respectively, according to embodiments.
Figure 15B:
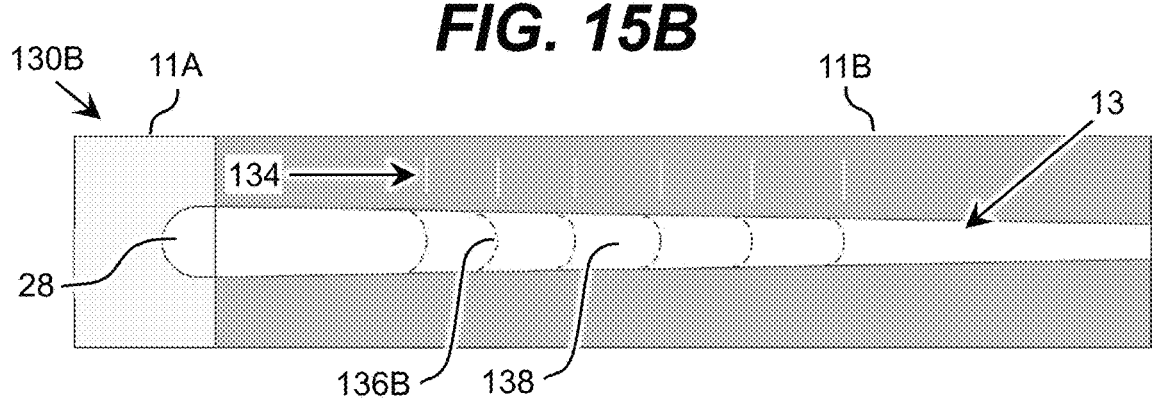

While the various embodiments shown herein have implied a channel 13 having a substantially constant cross-sectional area, it is understood that embodiments of a cartridge can include one or more channels 13 with a decreasing or increasing cross-sectional area. To this extent, FIGS. 15A and 15B show top views of illustrative cartridges 130A, 130B, each with a channel 13 having an increasing cross-sectional area and a decreasing cross-sectional area, respectively, according to embodiments. In general, a liquid will travel to the wider portion of the channel 13. By varying the cross-sectional area of the channel 13, the liquid is encouraged in the cartridge 130A to travel to the far end of the channel 13 and in the cartridge 130B to remain near the channel entrance adjacent to the deposition region 28. While the channels 13 are illustrated with varying lateral widths, it is understood that embodiments of a channel can include varying vertical heights, e.g., by having a distance between the substrates 11A, 11B vary along the channel 13.

In each case, when volume graduations 134 or other similar liquid flow structures are implemented in conjunction with such channels 13, the graduations 134 can be located with varying distances to account for the increasing or decreasing volume of liquid within the channel 13. Similarly, the graduations 134 can start from the corresponding end of the channel 13 at which the liquid will be located. To this extent, the cartridge 130A can have graduations 134 that start from a far end of the channel 13 and increase towards the channel entrance.

Additionally, the channel 13 of either cartridge 130A, 130B can include weirs 136A, 136B. The weirs 136A, 136B also can have varying spacing to define weir chambers 138 of substantially constant volumes. When implemented in conjunction with a widening channel as shown in FIG. 15A, a weir 136A can create a small obstruction that is convex toward the proximal end of the channel 13, the opposite direction as that shown in FIGS. 13A and 13B, so that the liquid will have a rounded trailing edge once it has reached a distal end of the channel 13. Similarly, the channel 13 shown in FIG. 15A can include a barrier structure 132 located at a distal end of the channel 13 and configured similar to the gate structures 102A, 102B shown in FIGS. 13A and 13B. In particular, the barrier structure 132 can be formed by depositing a photoresist layer on an internal facing surface of one or both substrates 11A, 11B. Furthermore, the barrier structure 132 can be configured to shape a leading edge of the liquid volume in the channel 13 and/or cause the leading edge of the liquid volume to remain within the channel 13, spaced from the distal edge of the substrates 11A, 11B, to provide a highly accurate starting line for measurement of the volume of liquid in the channel 13.

Figure 16:
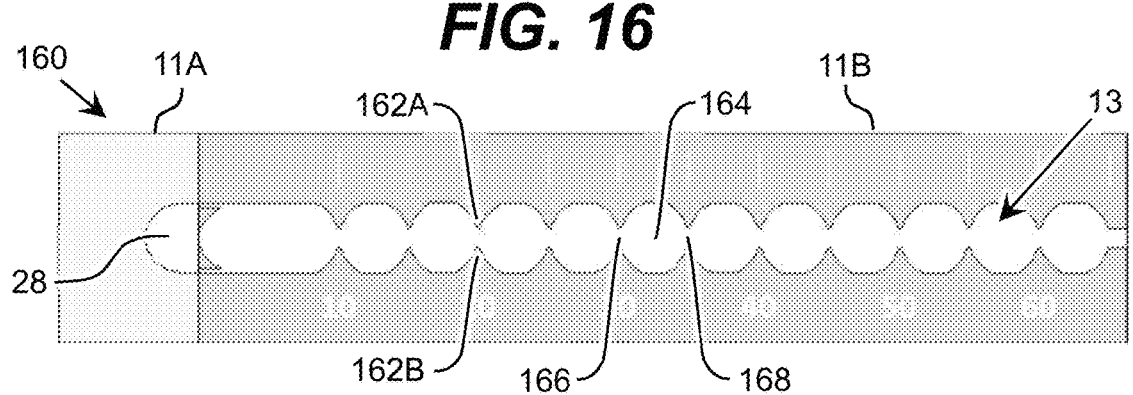
FIG. 16 shows a top view of an illustrative cartridge including a channel comprising a series of weir pockets according to an embodiment.

In another embodiment, a channel 13 can include two or more distinct regions defined by liquid flow structures located therein. For example, FIG. 16 shows a top view of an illustrative cartridge 160 including a channel 13 comprising a series of weir pockets 164 according to an embodiment. As illustrated, each weir pocket 164 can be formed by two pairs of opposing weirs 162A, 162B defining an entry 166 and an exit 168 for the weir pocket 164. The weirs 162A, 162B can be shaped to provide a rounded structure for the both the entry side and exit side of the weir pocket 164. When used for measuring a volume of a liquid, each weir pocket 164 can contain a known volume of the liquid once it has filled.

It is understood that the various features shown and described herein can be implemented on a cartridge in any of various combinations of features. Additionally, liquid flow structures described herein can be implemented in various similar, alternative configurations to those shown in the drawings.

Furthermore, while the various cartridges have been illustrated as being formed of two substrates 11A, 11B, it is understood that an embodiment of a cartridge can be implemented using a single substrate with multiple smaller substrates located thereon. Such a configuration can enable multiple columns of channels to be implemented on a single cartridge.

Figure 17A:
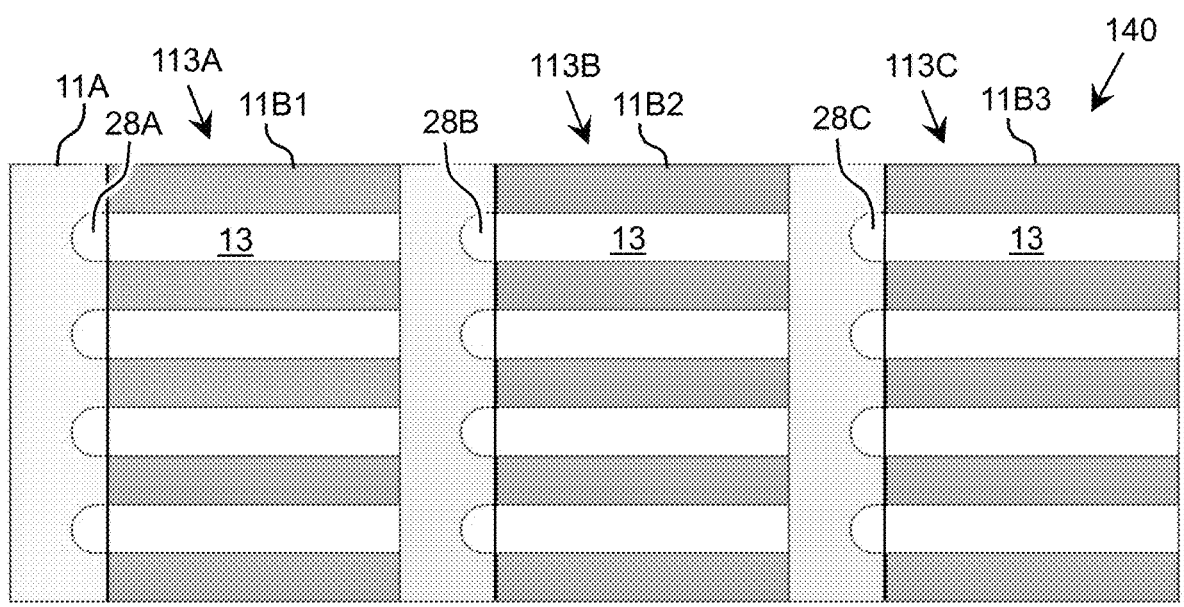
FIGS. 17A and 17B show schematic top and side views, respectively, of an illustrative multi-column cartridge according to an embodiment.
Figure 17B:
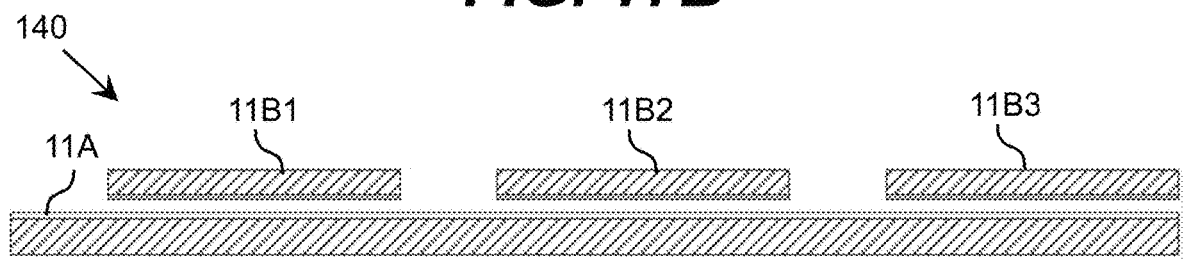

To this extent, FIGS. 17A and 17B show schematic top and side views, respectively, of an illustrative multi-column cartridge 140 according to an embodiment. In this case, the cartridge 140 includes a lower substrate 11A with three upper substrates 1161, 1162, 1163 located thereon. While not shown, it is understood that the substrates 11A, 1161-1163 can be secured to one another with a desired spacing there between using any solution described herein. As shown each upper substrate 1161-1163 can form a column 113A-113C of channels on a surface of the lower substrate 11A. However, it is understood that the orientation and number of channels and columns 113A-113C are only illustrative.

In an embodiment, a multi-column cartridge 140 can be configured for evaluating a particular liquid dispenser. For instance, a cartridge 140 can include multiple columns, where each column 113A-113C includes eight channels 13 with the corresponding dispensing areas 28A-28C for the channels 13 in each column 113A-113C on 9 millimeter spacing, which corresponds to the spacing of standard 96 well plates. Furthermore, the cartridge 140 can include four columns 113A-113C, which have dispensing regions 28A-28C on 27 millimeter spacing. In this case, such a cartridge 140 having a size comparable to a standard 96 well plate can hold 32 channels 13. As a result, three of these cartridges 140 can be used to test all 96 channels of a 96 pipette head of an automated liquid handler system used in conjunction with a standard 96 well plate.

Figure 18:
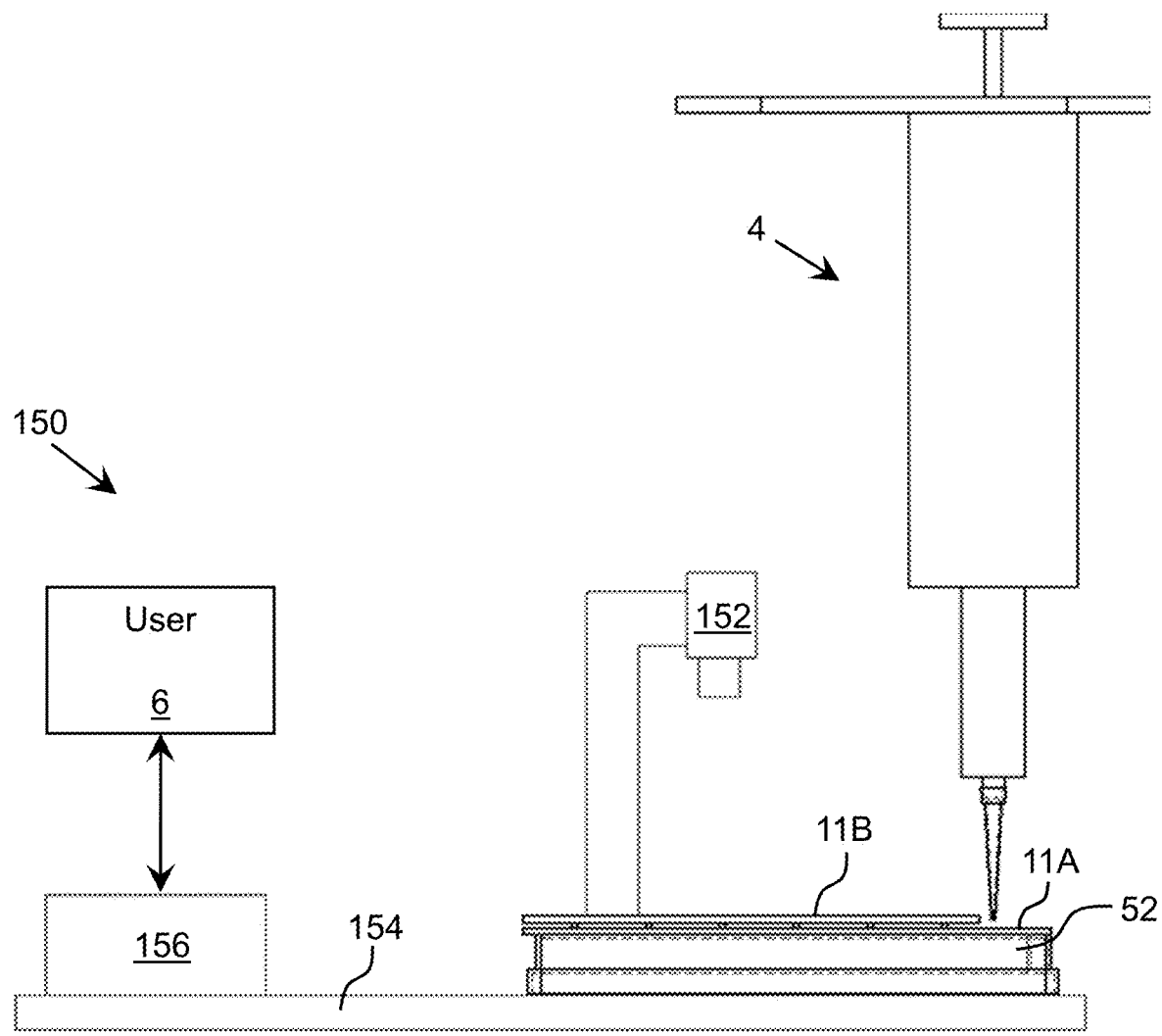
FIG. 18 shows an illustrative liquid evaluation system according to an embodiment.

A cartridge and/or liquid evaluation device described herein can be utilized in conjunction with a liquid evaluation system. For example, FIG. 18 shows an illustrative liquid evaluation system 150 according to an embodiment. The system 150 is shown including a cartridge including the substrates 11A, 11B within which liquid can be evaluated. The cartridge is shown supported by a stand, such as the stand 52. However, it is understood that the cartridge could be located in a frame as described herein and/or utilized without a stand or frame. The stand 52 is configured to position a cartridge in a desired orientation for dispensing a liquid into one or more channels located in the cartridge for subsequent evaluation. Once the cartridge has been positioned, the liquid can be dispensed into one or more channels of the cartridge, e.g., using a liquid handling device 4, such as an automated liquid handling system. The system 150 can be used to evaluate one or more attributes of the liquid located in the channel(s) using any solution.

To this extent, the system 150 also is shown including an imaging device 152. The imaging device 152 can acquire image data of one or more of the channels of the cartridge using any solution, which can be used as part of the evaluation of one or more of the attributes of the liquid. Illustrative imaging devices 152 include a camera which generates image data from any type of radiation (e.g., visible light), an electric circuit which senses changes in capacitance, induction, and/or resistance, at one or more points, or along a one-, two-, or three-dimensional gradient, a device that uses a scanning solution instead of a lens for generating an image, and/or the like. In an embodiment, the system 150 can further include a base 154, which is configured to hold the cartridge (e.g., the stand 52) and the imaging device 152 at an orientation that allows the imaging device 152 to acquire suitable image data of the channel(s) in the cartridge. For example, the base 154 can include one or more grooves, markings, and/or the like, that can direct a user as to proper placement of the stand 52 and the imaging device 152. In an embodiment, one or more of the stand 52 or the imaging device 152 is secured to the base 154 using any solution. Regardless, as illustrated, the imaging device 152 can be mounted and oriented such that its field of view is approximately orthogonal to a plane of a top of the cartridge (e.g., the substrate 11B).

In another embodiment, the imaging device 152 can be configured for use while being held by a user 6. For example, the imaging device 152 can be integrated in a handheld computing device, such as a mobile phone, a tablet, or the like, which includes a camera capable of being utilized to acquire suitable image data of the cartridge. Additionally, the handheld computing device can execute a software application that can analyze an area to be imaged by the camera for suitability and acquire an image when the imaging device 152 is determined to be properly located and focused. The software application can analyze the image data and/or provide the image data for analysis by the user 6 for its suitability for use in performing an evaluation described herein. In response to a determination that the image data is not suitable, the software application can enable the user 6 to reacquire the image data using the mobile device.

In an embodiment, the imaging device 152 (e.g., the handheld computing device with an imaging device) can provide the image data to a computer system 156. The computer system 156 can comprise any combination of one or more computing devices. Each computing device can be any type of computing device. An illustrative computing device includes a general purpose computing device programmed to perform some or all of an evaluation process described herein. However, it is understood that a computing device can comprise any type of computing device that may or may not execute program code. When the computer system 156 includes multiple computing devices, the computing devices can be located in disparate locations and communicate with one another via any combination of optical fiber, wired, and/or wireless links; utilize any combination of one or more types of networks; and/or utilize any combination of various types of transmission techniques and protocols. In an embodiment, the software application executing on the handheld computing device described herein can enable the handheld computing device to perform some or all of the evaluation process.

The evaluation process can be automated, semi-automated, or manual. Regardless, the computer system 156 can include a set of interfaces that enable a user 6 (e.g., a human and/or another computing device) to direct operation of the system 150 to perform an evaluation and/or otherwise interact with the system 150. For example, the user can obtain the results of an evaluation, review past evaluations, manage the data for one or more evaluations, etc. While not shown, it is understood that the system 150 can include any combination of various other devices that may be suitable for use in the evaluation. Such devices can include one or more lighting (visible or other radiation) devices, sensors for ambient conditions such as temperature or pressure, a container of a liquid (e.g., a dye or dyed liquid) to be used in an evaluation, and/or the like.

The computer system 156 can store the image data along with other data as a record of an evaluation. The other data can include any combination of various data corresponding to the evaluation including, for example: identification information for one or more of: a user, a liquid handling device (e.g., a serial number), a cartridge (e.g., serial number, cartridge identifier, etc.), and/or identification data of the liquid (e.g., type of liquid used, location of a sample, etc.); a date and time stamp; temperature data; measurement data; a result of the evaluation; and/or the like. In an embodiment, the computer system 156 can process the image data to evaluate one or more of the attributes of the liquid. For example, the computer system 156 can process the image data to determine (measure) one or more of: a volume, a color, a clarity, and/or the like, of the liquid present in a channel.

The system 150 can be configured for use in conjunction with any type of liquid handling device 4 or system. An example of a liquid handling device is an automated liquid handling system or multi-channel or single channel pipette. The pipette can be utilized by a human user or operated by a robotic device under automatic or semiautomatic control. However, it is understood that a pipette is only illustrative of various types of human and/or machine operated liquid handling devices capable of being used in conjunction with embodiments of the invention described herein, such as robotic liquid handlers.

Details of illustrative aspects of the invention have been described in conjunction with a multichannel cartridge, which can be used to measure a volume of a liquid in one or more of the channels of the cartridge. The volume measurement can be part of, for example, a process for determining an accuracy of a liquid handling device (e.g., an automated liquid handling system), a consistency (e.g., repeatability) and/or accuracy with which a volume of liquid is dispensed by a liquid handling system (e.g., a robotic system, a user operating a pipette, and/or the like). The multichannel cartridge can include a number of channels with a corresponding spacing between the channels that are configured to enable a corresponding multichannel liquid handling device to concurrently dispense liquid from each of its dispensing spouts into distinct channels of the cartridge.

However, it is understood that embodiments of the invention described herein are not limited to multichannel cartridges and/or liquid volume measurement. To this extent, embodiments of the invention can comprise a cartridge including a single channel. Additionally, embodiments of the invention can be utilized to evaluate one or more other attributes of the liquid volume, such as a color, a clarity, and/or the like. Such evaluations can be part of various processes for evaluating a liquid, such as for a presence of one or more chemicals, contaminants, and/or the like. In this case, a liquid sample can be obtained and placed within a channel, with or without treatment, to evaluate the corresponding attribute(s) of the liquid. Still further, embodiments of a multichannel cartridge can include channels configured to measure different volumes of a liquid, e.g., to enable testing of an ability of a liquid handling system to accurately dispense different volumes of liquid.

It is understood that, unless otherwise specified, each value is approximate and each range of values included herein is inclusive of the end values defining the range. Terms of degree such as "generally," "substantially," "about," and "approximately" as used herein mean a reasonable amount of deviation of the modified term such that the end result is not significantly changed. For example, these terms can be construed as including a deviation of at least +/−0.5% of the modified term if this deviation would not negate the meaning of the word it modifies. In a more particular example, the term "approximately" is inclusive of values within +/− ten percent of the stated value, while the term "substantially" is inclusive of values within +/− five percent of the stated value when these deviations would not negate the meaning of the word each term modifies.

As used herein, unless otherwise noted, the term "set" means one or more (i.e., at least one) and the phrase "any solution" means any now known or later developed solution. The singular forms "a," "an," and "the" include the plural forms as well, unless the context clearly indicates otherwise. Additionally, the terms "comprises," "includes," "has," and related forms of each, when used in this specification, specify the presence of stated features, but do not preclude the presence or addition of one or more other features and/or groups thereof.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A cartridge for evaluating liquid, the cartridge comprising:
    a first substrate having a first internal facing side;
    a second substrate coupled to the first substrate, the second substrate having a second internal facing side facing the first internal facing side, wherein the first and second internal facing sides form opposing surfaces of each of a set of channels located between the first internal facing side and the second internal facing side, wherein the set of channels includes a channel configured to contain a liquid column by capillary action;
    at least one coating located on at least one of the first internal facing side or the second internal facing side, wherein the at least one coating defines a set of barrier regions located between the first internal facing side and the second internal facing side, wherein the set of barrier regions includes a barrier region adjoining the channel, and wherein an edge of the at least one coating defines a border between the channel and the barrier region adjoining the channel;
    an air gap located between each of the at least one coating and the other of the first internal facing side or the second internal facing side, wherein the barrier region adjoining the channel has a size and a surface configured to cause a liquid column located in the channel to follow the channel due to the capillary action, without flowing into the barrier region adjoining the channel; and
    at least one liquid flow structure located in the channel, wherein the at least one liquid flow structure is configured to facilitate liquid flow through the at least one liquid flow structure to control a shape and a location of a leading edge and/or a trailing edge of a liquid column located in the channel, and wherein each of the at least one liquid flow structure includes:
        a plurality of barriers extending across a lateral width of the channel; and
        at least one opening located between the plurality of barriers, wherein the at least one opening provides a path for the liquid column to flow through the each of the at least one liquid flow structure.

2. The cartridge of claim 1, wherein each of the plurality of barriers comprises a photoresist material located on at least one of the first internal facing side or the second internal facing side.

3. The cartridge of claim 1, wherein the at least one liquid flow structure includes an entrance liquid flow structure located in an entrance of the channel defined by a proximal end of at least one of the first substrate or the second substrate, wherein the entrance liquid flow structure includes a plurality of gate structures forming at least one gate through which liquid enters the channel.

4. The cartridge of claim 3, wherein the channel is configured to maintain the trailing edge of the liquid at an innermost edge of the plurality of gate structures, and wherein the plurality of gate structures are configured to form a rounded trailing edge of the liquid at the innermost edge of the plurality of gate structures.

5. The cartridge of claim 1, wherein the at least one liquid flow structure includes a plurality of weirs located along a length of the channel, wherein two weirs form a weir chamber in a space therebetween, and wherein the weir chamber holds a known volume of liquid.

6. The cartridge of claim 1, wherein at least a portion of the channel has a cross-sectional area measured at a right angle to an axis of the channel that increases in a direction moving away from an entrance of the channel through which liquid enters the channel.

7. The cartridge of claim 1, further comprising a plurality of fillable graduation marks located on at least one lateral side of the channel, wherein each of the plurality of fillable graduation marks is configured to cause liquid to enter the fillable graduation mark as the leading each of the liquid flows through the channel.

8. The cartridge of claim 7, wherein at least some of the plurality of fillable graduation marks comprise a textual fillable graduation, wherein the textual fillable graduation includes a fillable region having a shape of a number or a letter when viewed from above.

9. The cartridge of claim 1, further comprising a plurality of graduations formed in the at least one coating bordering the channel, wherein each of the plurality of graduations corresponds to a liquid volume measurement and has a thickness configured to prevent liquid located in the channel from entering the graduation.

10. The cartridge of claim 1, further comprising:
    a deposition region located on one of the first or second substrates adjoining an entrance for the channel defined by a proximal end of the other of the first or second substrates; and
    a deposition coating located on the one of the first or second substrates, the deposition coating defining an area on the one of the first or second substrates corresponding to the deposition region, wherein the deposition coating includes a plurality of protrusions located around a perimeter of the deposition region.

11. The cartridge of claim 1, wherein a lateral area of the second substrate is smaller than a lateral area of the first substrate, the cartridge further comprising a third substrate having a third internal facing side facing the first internal facing side, wherein a second set of channels for evaluating liquid are formed between the first internal facing side and the third internal facing side.

12. A cartridge for evaluating liquid, the cartridge comprising:
    a first substrate having a first internal facing side;
    a second substrate coupled to the first substrate, the second substrate having a second internal facing side facing the first internal facing side, wherein the first and second internal facing sides correspond to opposing surfaces of each of a set of channels located between the first internal facing side and the second internal facing side, wherein in the set of channels includes a channel configured to contain a liquid column by capillary action;
    at least one coating located on at least one of the first internal facing side or the second internal facing side, wherein the at least one coating defines a set of barrier regions located between the first internal facing side and the second internal facing side, wherein the set of barrier regions includes a barrier region adjoining the channel, and wherein an edge of the at least one coating defines a border between the channel and the barrier region adjoining the channel;
    an air gap located between each of the at least one coating and the other of the first internal facing side or the second internal facing side, wherein the barrier region adjoining the channel has a size and a surface configured to cause a liquid column located in the channel to follow the channel due to the capillary action, without flowing into the barrier region adjoining the channel; and a plurality of liquid flow structures including a plurality of weirs located along at least a portion of a length of the channel, wherein the plurality of weirs define a set of weir chambers in a set of spaces therebetween, wherein the set of weir chambers includes a weir chamber configured to hold a known volume of liquid located in the channel, and wherein each of the plurality of weirs includes:
- a plurality of coatings located on at least one of the first internal facing side or the second internal facing side, wherein the plurality of coatings extend across a lateral width of the channel; and
- at least one opening located between the plurality of coatings, wherein the at least one opening provides a path for the liquid to flow through the each of the plurality of weirs.

13. The cartridge of claim 12, wherein the plurality of liquid flow structures further includes an entrance liquid flow structure located in an entrance of the channel, wherein the entrance liquid flow structure includes a plurality of gate structures forming at least one gate through which liquid enters the channel.

14. The cartridge of claim 12, wherein at least one of the set of weir chambers is configured to form at least one of: a rounded leading edge or a rounded trailing edge of a liquid column in the channel.

15. The cartridge of claim 12, further comprising:
- a deposition region located on one of the first or second substrates immediately adjacent to an entrance for the channel; and
- a deposition coating located on the one of the first or second substrates, the deposition coating defining an extent of the deposition region, wherein the deposition coating includes a plurality of protrusions located around a perimeter of the deposition region.

16. A liquid evaluation device comprising:
a cartridge comprising:
- a first substrate having a first internal facing side;
- a second substrate coupled to the first substrate, the second substrate having a second internal facing side facing the first internal facing side, wherein the first and second internal facing sides form opposing surfaces of each of a set of channels located between the first internal facing side and the second internal facing side, wherein the set of channels includes a channel configured to contain a liquid column by capillary action;
- at least one coating located on at least one of the first internal facing side or the second internal facing side, wherein the at least one coating defines a set of barrier regions located between the first internal facing side and the second internal facing side, wherein the set of barrier regions includes a barrier region adjoining the channel, and wherein an edge of the at least one coating defines a border between the channel and the barrier region adjoining the channel;
- an air gap located between each of the at least one coating and the other of the first internal facing side or the second internal facing side, wherein the barrier region adjoining the channel has a size and a surface configured to cause a liquid column located in the channel to follow the channel due to the capillary action, without flowing into the barrier region adjoining the channel; and
- at least one liquid flow structure located in the channel, wherein the at least one liquid flow structure is configured to facilitate liquid flow through the at least one liquid flow structure to control a shape and a location of a leading edge and/or a trailing edge of a liquid column located in the channel, and wherein each of the at least one liquid flow structure includes:
  - a plurality of barriers extending across a lateral width of the channel; and
  - at least one opening located between the plurality of barriers,
  wherein the at least one opening provides a path for the liquid column to flow through the each of the at least one liquid flow structure; and
a base on which the cartridge is mounted.

17. The liquid evaluation device of claim 16, further comprising a background layer on the base and located between the cartridge and the base.

18. The liquid evaluation device of claim 16, further comprising a cover attached to the base, wherein the cover includes a cover ledge and a cover perimeter wall which hold outer edges of the cartridge between the cover and the base.

19. A liquid evaluation system comprising:
a liquid evaluation device of claim 16; and
an imaging device configured to acquire image data of the liquid evaluation device.

20. The liquid evaluation system of claim 19, further comprising a computer system configured to evaluate the volume of liquid within the channel based on image data acquired by the imaging device.

* * * * *